United States Patent
Taylor et al.

(10) Patent No.: US 7,621,214 B2
(45) Date of Patent: Nov. 24, 2009

(54) BALING APPARATUS

(75) Inventors: James Cameron Taylor, Preston (GB); Nigel Damian Haworth, Chorley (GB)

(73) Assignee: Creo Products Limited, Lancashire (GB)

( * ) Notice: Subject to any disclaimer, the term of this patent is extended or adjusted under 35 U.S.C. 154(b) by 0 days.

(21) Appl. No.: 10/595,463

(22) PCT Filed: Oct. 21, 2004

(86) PCT No.: PCT/GB2004/004450

§ 371 (c)(1),
(2), (4) Date: Jan. 23, 2007

(87) PCT Pub. No.: WO2005/041640

PCT Pub. Date: May 12, 2005

(65) Prior Publication Data

US 2007/0214970 A1     Sep. 20, 2007

(30) Foreign Application Priority Data

Oct. 25, 2003  (GB) ................ 0324942.2

(51) Int. Cl.
*B30B 5/06*  (2006.01)
(52) U.S. Cl. .......................... 100/88; 100/89
(58) Field of Classification Search ............... 100/87, 100/88, 89; 56/341, 344; 242/541.2, 541.3
See application file for complete search history.

(56) References Cited

U.S. PATENT DOCUMENTS

| | | | |
|---|---|---|---|
| 3,964,232 A * | 6/1976 | Bender et al. | 53/430 |
| 4,205,513 A | 6/1980 | Shokoples | |
| 4,262,478 A | 4/1981 | Pentith | |
| 4,549,481 A * | 10/1985 | Groeneveld et al. | 100/98 R |
| 4,763,464 A * | 8/1988 | Mouret | 56/341 |
| 5,425,512 A * | 6/1995 | Bichot et al. | 242/541.3 |
| 5,768,986 A * | 6/1998 | Arnold et al. | 100/88 |
| 6,681,689 B2 * | 1/2004 | Geiser | 100/88 |

FOREIGN PATENT DOCUMENTS

| | | |
|---|---|---|
| DE | 2626263 | 12/1977 |
| FR | 2.226.923 | 11/1974 |

* cited by examiner

*Primary Examiner*—Jimmy T Nguyen
(74) *Attorney, Agent, or Firm*—The Webb Law Firm

(57) ABSTRACT

Baling apparatus including at least two first and second mutually opposed and inclined conveyors, each conveyor having a first end and a second end, the second ends being arranged to be spaced apart to form a material entry region into which material to be baled is, in use, deposited, the first ends being relatively closely adjacent to each other, and the apparatus being arranged such that material deposited into the entry region moves toward a pinch region where the two conveyors are close to one another and where the deposited material is rolled and compressed into a bale, the conveyors being driven in opposite directions to roll and compact the material between them, and the conveyors being mutually displaceable and resiliently biased towards one another.

36 Claims, 34 Drawing Sheets

BALING APPARATUS

CROSS REFERENCE TO RELATED APPLICATIONS

This application is a national stage filing under 35 U.S.C. 371 of PCT/GB2004/004450 filed Oct. 21, 2004, which claims priority to GB 0324942.2, filed Oct. 25, 2003.

BACKGROUND OF THE INVENTION (1) Field of the Invention

The invention relates to a baling apparatus and method.

(2) Description of Related Art

Baling machines and presses are well known in the art for the compaction and storing of materials such as hay, straw, cardboard, food waste and paper waste. Generally, known baling apparatus is relatively bulky and heavy and for these reasons is often restricted to industrial type settings. However, the use of baling in order to compact and store material can be an advantageous way to deal with particular types of waste, such as shredded paper waste. Indeed, many offices (for instance) shred their paper waste in order to routinely dispose of printed matter in a secure fashion. By their very nature, paper shredders tend to produce an output which takes up a lot of space and on-site baling of such shredded output is therefore clearly desirable in order to reduce storage requirements. Further, baling is a very economical way of storing material and preparing for transport as packaging is kept to a minimum.

SUMMARY OF THE INVENTION

It is an aim of embodiments of the present invention to provide a baling apparatus which is simple to implement and relatively space efficient.

Particular features of the invention are recited in the claims, whilst other preferred features are also set out in the following statements.

According to a first aspect of the invention, there is provided baling apparatus comprising at least two mutually opposed and inclined conveyors, each of said conveyors having a first end and a second end, wherein the first ends of each conveyor are arranged to be closely adjacent to each other and the second ends are arranged to be spaced apart to form an entry region into which material to be baled may be deposited, the apparatus being arranged such that material deposited into the entry region moves toward a pinch region where the two conveyors are close to one another and where the deposited material is rolled and compressed into a bale, the conveyors being mutually displaceable and resiliently biased towards one another.

Preferably, said conveyors comprise a pair of conveyors driven in opposed directions and provided in a V formation, the first ends of the conveyors forming the base of the V, and the second ends forming the top of the V.

Each conveyor may be arranged to pivot about its first end to broaden the pinch region as more material is deposited.

Preferably, the second end of each conveyor is arranged, in use, so as to travel along a fixed path guided by guide means and the first ends are each arranged so as to pivot about respective rotational axes, the second ends of the conveyors being arranged to diverge, in use, as more waste material is baled between the two opposed conveyors.

Preferably, each conveyor has a belt of substantially constant length, the conveyors being arranged so as to bow outwardly as the circumference of baled material held between them increases, avoiding the need for a separate belt take-up means.

Each conveyor preferably includes a plurality of rollers.

Preferably, each conveyor comprises a plurality of articulated sections.

Preferably, resilient biasing means is provided to resiliently bias the second ends toward one another, such that, as more and more material is deposited into the entry region the resilient biasing acts so as to compact the material between the opposed conveyor belts.

Preferably, the resilient biasing means comprises a spring and a guide, the guide having first and second ends and the spring acting so as to bias an associated second end of the conveyor toward the first end of the guide.

Preferably, as more and more material is deposited into the gap between the two conveyors and the size of the compacted material held between them increases, the resilient biasing is opposed and the resiliently biased second end of the conveyor is guided by said guide from a position adjacent the first end of the guide toward a position nearer to the second end of the guide.

Preferably, as more and more material is deposited into the gap between the two conveyors, the second ends of the conveyors are forced apart against the action of the resilient biasing means to travel along a path dictated by the guide means.

Preferably, each second end of each conveyor is provided with resilient biasing means. Alternatively, only one conveyor may be provided with the resilient biasing means.

Preferably, means are provided for mutually spreading the second ends of the conveyors following the end of a baling operation to facilitate the removal of material which has been compacted between the conveyors. Such means may comprise disengaging at least one second end from its associated resilient biasing means to allow said at least one second end to be freely moved away from the second end of the other conveyor. Alternatively, such means may comprise disengaging an associated resilient biasing means from a fixed chassis mounting point to allow both the resilient biasing means and the associated second end of conveyor to move. Of course, such means may be provided to allow removal of the baled material from either side of the apparatus or from top or bottom access areas.

Preferably, the first and second conveyors include belts which are driven at different speeds such that one conveyor runs faster than the other.

According to a second aspect of the invention, there is provided baling apparatus comprising at least two mutually opposed and inclined conveyors, each conveyor having a first end and a second end, the second ends forming a material entry end of the apparatus, and an intermediate point between the first and second end of each conveyor being arranged to form a pinch region of the apparatus where the two conveyors are close to one another and, in use, driven in opposite directions to roll and compact material between them, the pair of conveyors being mutually displaceable and resiliently biased towards one another at the pinch region.

Preferably, said conveyors comprise a pair of conveyors provided in a Y formation, the first ends of the conveyors forming the base of the Y, and the second ends forming the top of the Y.

Preferably each conveyor comprises a plurality of rollers (or guides) around which extends a continuous belt.

Preferably, each conveyor comprises at least a pair of end rollers, defining outer limits of the conveyor and at least one intermediate roller.

Preferably, the pinch region is defined by an adjacent relation of intermediate rollers of the opposed conveyors forming an area of constriction within which, in use, material to be baled gathers to be rolled.

Preferably, at least one intermediate roller of one of the conveyors is resiliently biased toward the pinch region such that as more waste material is baled between the opposed conveyors the resilient biasing acts to compact the waste material.

Preferably, the at least one intermediate roller is resiliently biased toward the pinch region by resiliently biased guide means, such that as the bale expands, intermediate rollers of the opposed conveyors are forced away from one another along defined paths.

Preferably, during an initial state in which the apparatus has no waste material deposited into it, at least one intermediate roller of one conveyor is arranged to not be in contact with its respective belt, such that the belt is not directly supported in the area of the pinch region.

Preferably, the rollers at the second end of each conveyor are arranged, in use, so as to travel along a fixed path guided by guide means, the second ends of the conveyors being arranged to diverge, in use, as more waste material is baled between the two opposed conveyors to broaden the entry region.

Preferably, in an initial state of the apparatus, at least one pair of opposed rollers of the two conveyors have central axes which are vertically displaced from one another, and are separated horizontally from each other by a horizontal distance which is less than a sum of the radii of the respective two rollers.

Preferably, the opposed rollers in question comprise rollers at the first end of the conveyors. They may also/alternatively comprise at least a pair of intermediate rollers positioned above the pinch region. The relative displacement of rollers in this fashion ensures that there is no straight line path between belts of the conveyors such that material deposited into the entry region is not allowed to escape.

Preferably, each conveyor has a belt of substantially constant length, the conveyors being arranged so as to bow outwardly as the circumference of baled material held between them increases.

Preferably, resilient biasing means is provided to resiliently bias the second ends toward one another, such that, as more and more material is deposited into the entry region the resilient biasing acts so as to compact the material between the opposed conveyor belts. Preferably, the resilient biasing means at the second ends are further arranged to provide tension to the associated conveyor.

The resilient biasing and the guide means may be provided by either separate or combined resilient biasing and guiding means operating along shared or separate axes. For instance, the resilient biasing may take the form of a spring in tension or compression, or a hydraulic, gas or pneumatic cylinder or any other suitable means. The guiding means may comprise slots formed in chassis members constricting movement of conveyor rollers/guides to particular pathways, or may comprise elongate members with end stops and over which a spring may be arranged, or could for instance comprise some form of mechanical linkage to restrict movement of the conveyors in various directions. Therefore, while a few types of resilient biasing and guiding means have been mentioned, it will be appreciated that the invention should not be limited to the particular examples discussed.

Preferably, as more and more material is deposited into the gap between the two conveyors and the size of the compacted material held between them increases, the resilient biasing is opposed and the guide means is arranged to guide the associated roller from a position adjacent the first end of the guide toward a position nearer to the second end of the guide.

Preferably, a roller at each second end of each conveyor and at least one intermediate roller of each conveyor is provided with resiliently biasing and guide means. Alternatively, only one conveyor may be provided with the resilient biasing means.

Preferably, the first and second conveyors which are driven at different surface speeds such that one conveyor runs faster than the other.

Preferably, the faster conveyor runs in a direction to urge material from the entry region toward the pinch region.

One of the benefits of the differential surface speeds is that, when combined with surface friction, the effect is a "winding" up action, i.e., waste material is driven/urged into the mass of the bale and then forced to slow down due to the slower belt speed, the effect being to improve compaction of the waste material.

The bale/material being turned by the belts is pulled down by the faster conveyor, the slower upward belt holds back the bale/material—hence the material is tightened around the bale.

Preferably, means are provided for mutually spreading the second ends of the conveyors following the end of a baling operation to facilitate the removal of material which has been compacted between the conveyors. Such means may comprise disengaging at least one second end from its associated resilient biasing means to allow said at least one second end to be freely moved away from the second end of the other conveyor. Alternatively, such means may comprise disengaging an associated resilient biasing means from a fixed chassis mounting point to allow both the resilient biasing means and the associated second end of conveyor to move or may comprise means for pivoting one conveyor away from the other conveyor. Of course, such means may be provided to allow removal of the baled material from either side of the apparatus or from top or bottom access areas.

Means for facilitating the removal of compacted material from the apparatus may comprise movement of the first and second conveyors away from one another to provide access to the compacted material. Here, the first conveyor may be supported by a first sub-chassis, and the second conveyor by a second sub-chassis, removal of the compacted material being facilitated by disassociating the first sub-chassis from the second sub-chassis—here, "disassociating" includes, but is not limited to, spreading the apparatus by pivoting one sub-chassis away from the other to allow access to an interior of the apparatus. The biasing means and guide means may be associated with respective sub-chassis and remain associated with such sub-chassis both during compacting operations and operations for removal of compacted material.

Means may be provided for gathering material falling outside of the entry region to incorporate such material into the bale. Such means may comprise an outer skin positioned toward a return side of each conveyor away from a baling side, the outer skin being arranged such that when the bale is near a maximum size, the conveyor is arranged to pick up such material trapped between it and the outer skin and transport this material toward the pinch region.

The apparatus may further comprise a bale wrapping mechanism for wrapping completed bales.

The apparatus of the first and second aspects may be provided with any of the features of any of the other aspect in any logical combination.

According to a third aspect of the invention, there is provided a method of baling material, the method comprising:

(A) depositing material to be baled into an entry region formed between two mutually inclined and opposed conveyors;
(B) driving the conveyors in opposite directions to roll the deposited material between them; and
(C) resiliently biasing the conveyors toward one another at a pinch region to compact the deposited material into a bale.

Preferably, material deposited in step (A) is moved from a relatively wide entry region to the narrower pinch region where it is compacted and rolled.

Movement from the wide entry region to the narrower compaction region may be under gravity, air/gas pressure, friction or hydraulic pressure or any combination thereof.

Preferably, the conveyors are biased towards one another by resilient biasing means. The resilient biasing means are preferably provided adjacent the entry region and/or adjacent the pinch region.

Preferably, as more material is deposited, the pinch region is arranged to expand against the action of the resilient biasing to compress material within the pinch region. Preferably, as more material is deposited, the entry region is arranged to expand to allow entry of more material and, under action of the resilient biasing to compact it.

Preferably, the first and second conveyors include belts which are driven at different speeds such that one conveyor runs faster than the other.

Preferably, the faster conveyor has a belt which runs in a direction to urge material from the entry region toward the pinch region.

Preferably, in an initial state of the apparatus, at least one pair of opposed rollers of the two conveyors have central axes which are vertically displaced from one another, and are separated horizontally from each other by a horizontal distance which is less than a sum of the radii of the respective two rollers.

Preferably, the opposed rollers in question comprise rollers at the first end of the conveyors. They may also/alternatively comprise at least a pair of intermediate rollers positioned above the pinch region. The relative displacement of rollers in this fashion ensures that there is no straight line path between belts of the conveyors such that material deposited into the entry region is not allowed to escape.

Preferably, during an initial state in which the apparatus has no waste material deposited into it, at least one intermediate roller of one conveyor is arranged to not be in contact with its respective belt, such that the belt is not directly supported in the area of the pinch region.

The method of the third aspect may include any of the limiting features of the first or second aspects in any logical combination.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF THE INVENTION

Figure 1:
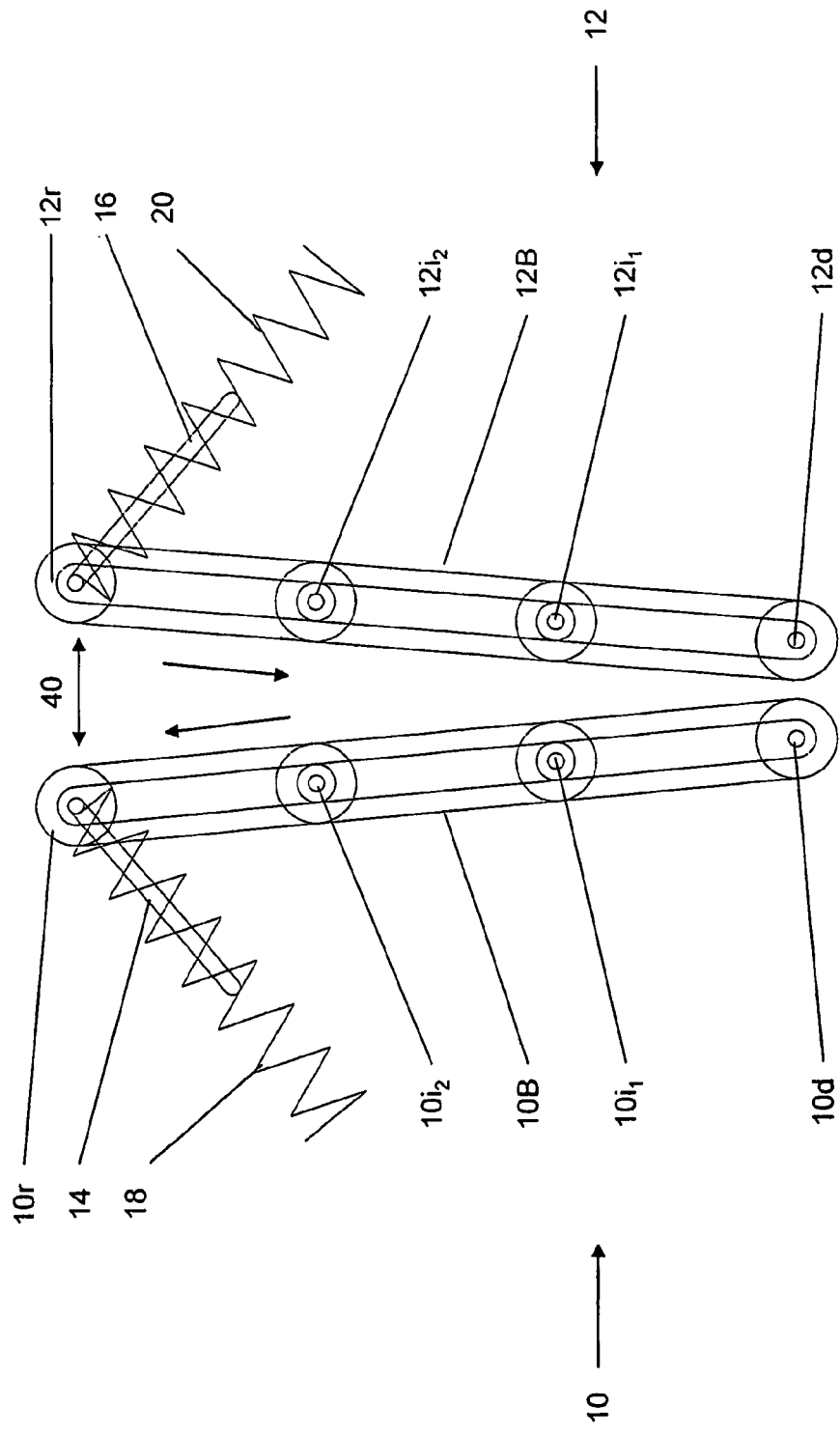
FIGS. 1 through 5 show a baling apparatus according to a first embodiment of the invention, the baling apparatus being shown in various configurations according to a quantity of material being baled.

FIG. 1 shows baling apparatus comprising a first conveyor 10, a second conveyor 12, first resilient biasing means comprising a first guide 14, and first spring 18 and second resilient biasing means comprising a second guide 16 and second spring 20.

Each of the first and second conveyors 10, 12 comprise driven rollers $10d$, $12d$ positioned at a first end thereof, and return rollers $10r$, $12r$ positioned at a second end, as well as plurality of intermediate rollers $10i_1$, $10i_2$, $12i_1$, $12i_2$. Each of the intermediate rollers $10i_1$ through $12i_2$ provide a point of articulation of the conveyors 10, 12, such that each conveyor may hinge about the central rotational axis of each of said intermediate rollers. Further, the first and second conveyors 10, 12 also include a belt 10B, 12B which is driven by the driven rollers $10d$, $12d$ in continuous fashion. Here, the belts 10B, 12B work in opposition.

The resilient biasing means comprising springs 18, 20 and guides 14, 16 act to urge the return rollers toward inner end stops (not shown) of the guides which in an initial configuration limit the innermost point of travel of the return rollers $10r$, $12r$ and define a minimum width of an entry region 40 into which material to be compacted and baled is deposited.

Operation of the baling apparatus of FIG. 1 will now be described with the aid of FIGS. 1 through 6.

It will be noted from FIG. 1, that the driven rollers $10d$, $12d$ situated at a first end of the first conveyor 10 and second conveyor 12 are situated relatively close to one another forming a pinch region of the apparatus in which the belts 10B, 12B are closest to one another, whilst, at the second ends the return rollers $10r$, $12r$ are relatively far apart at positions defined by inner end stops so as to form the entry region 40 into which waste, such as paper, may be deposited. Here, the apparatus is shown as working under gravity/friction such that material dropped into the entry region 40 between the return rollers $10r$, $12r$ will fall towards the first end of the conveyors 10, 12. The central axis of each return roller $10r$, $12r$ is constrained so as to move along a path dictated by the first guide 14 and second guide 16, respectively, as more and more material is deposited into the baling apparatus. This principle is explained in more detail in relation to FIGS. 2 through 5 below.

Figure 2:
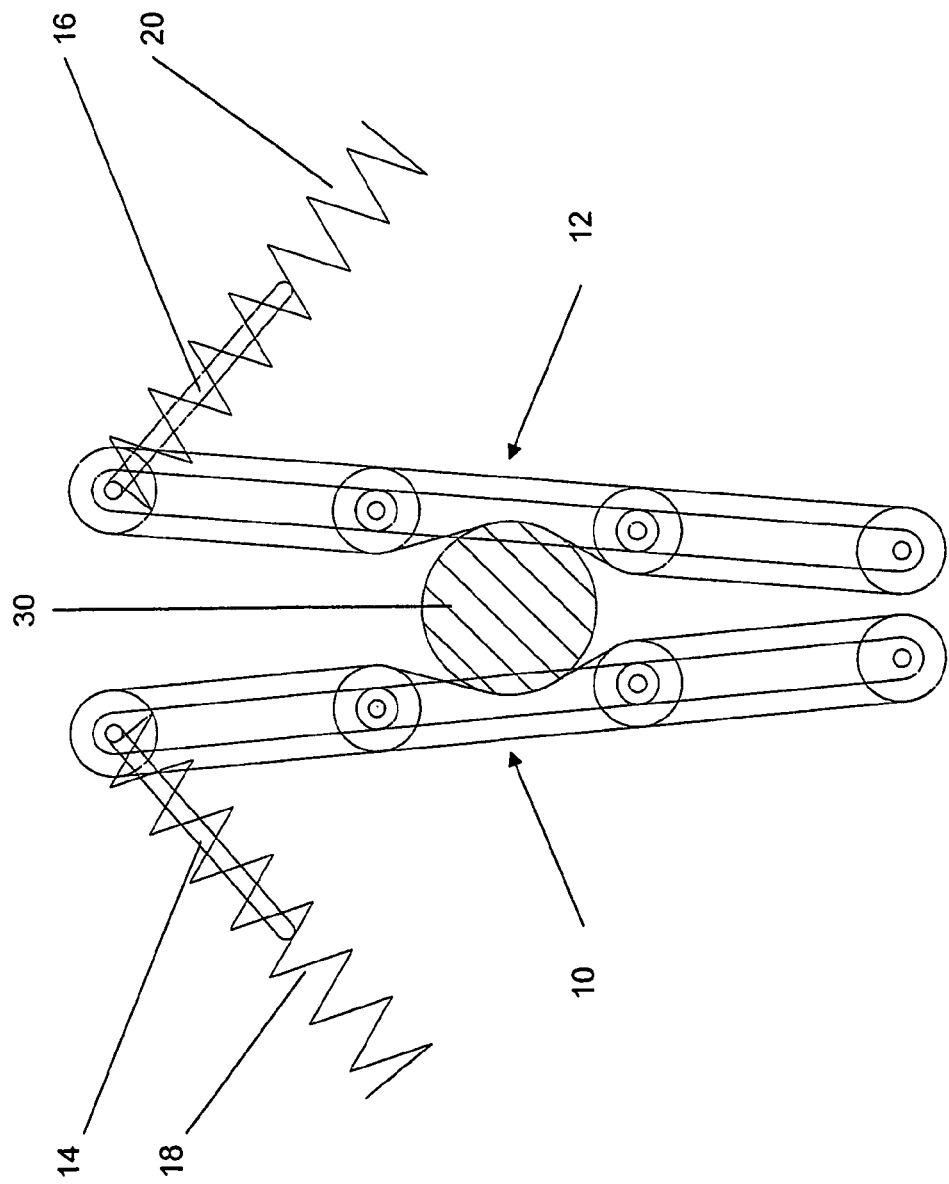
Figure 3:
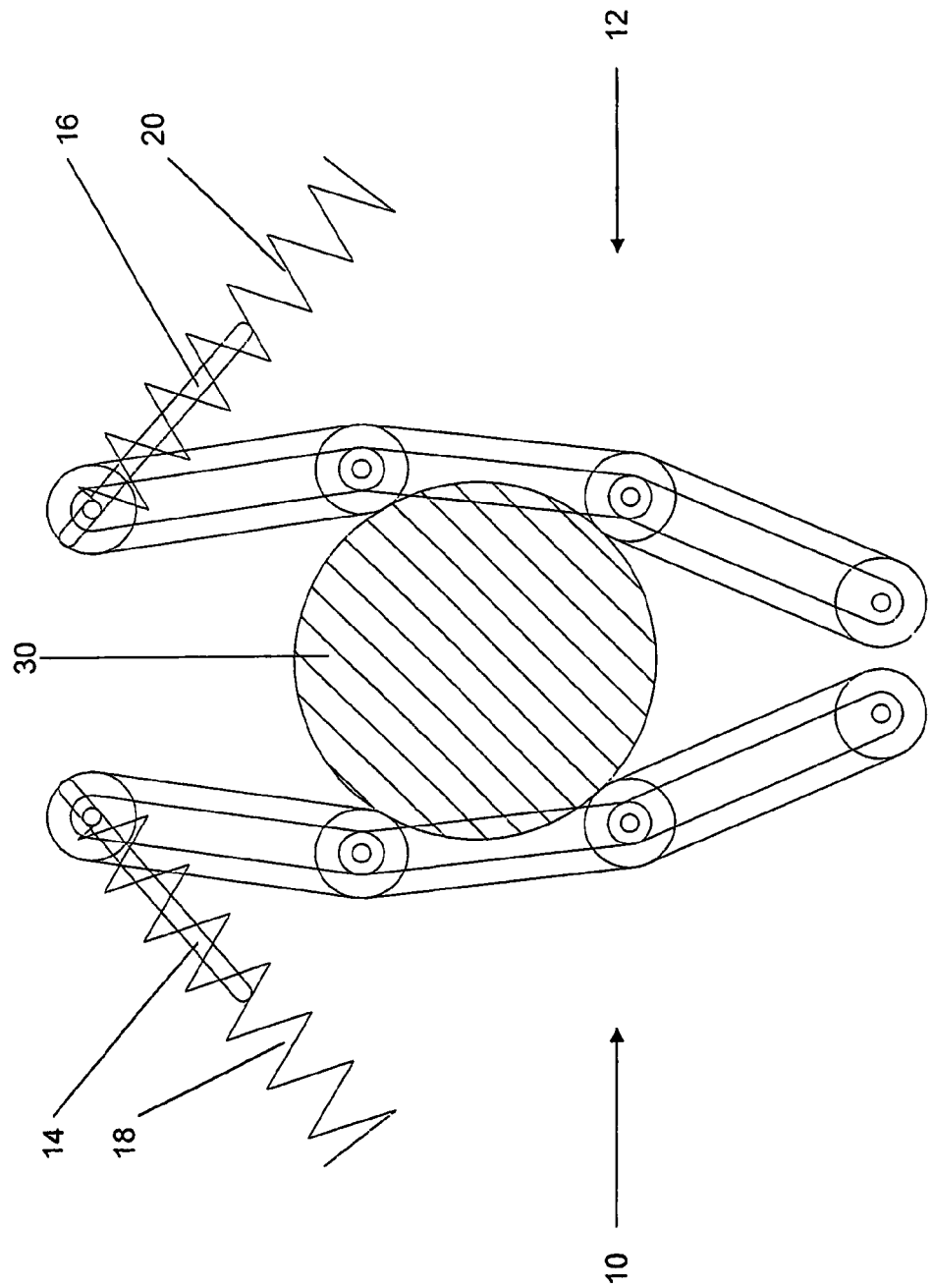
Figure 4:
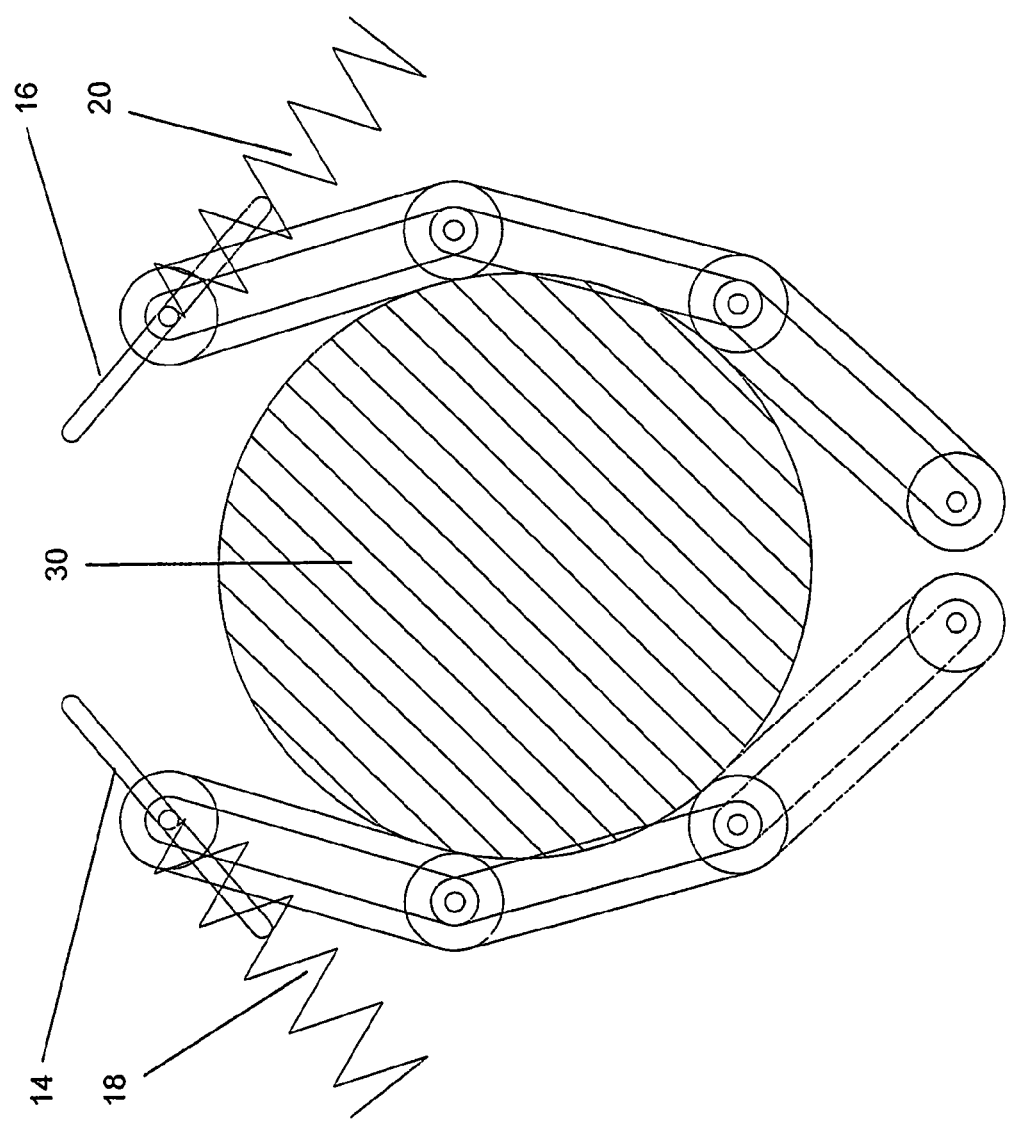

Whilst FIG. 1 shows an initial state of the baling apparatus, without any waste material having been deposited into it, FIG. 2 shows a second state in which a moderate amount of material has been deposited into the entry region 40 between the return rollers 10r, 12r. Here, the material 30 is shown in a baled fashion that it will naturally assume if the conveyor belts 10B, 12B drive in opposed directions as shown by the arrows of FIG. 1. This natural baling effect occurs because the waste material naturally travels under gravity towards the first ends defined by the driven rollers 10d, 12d. The second conveyor belt 12B tends to try and move the waste toward the first end, whilst the first conveyor belt 10B acts on the opposite side of the waste material to drive towards the open mouth formed by the entry region 40. With one side of the waste being driven in one direction, and the other side being driven in the other direction, and gravity acting to keep the waste between the two conveyor belts 10B, 12B, the material is naturally rolled whilst at the same time compression is caused by the first and second resilient biasing means (i.e. here, the springs 18, 20) to compact or "pinch" the material. Here, the rolling and compacting actions form a bale 30 of cylindrical shape.

The material of the belt 10B, 12B is directly supported underneath it only at points defined by the intermediate rollers $10i_1$, $10i_2$ and $12i_1$, $12i_2$ and outside of those points it may flex somewhat to adapt to the naturally formed curvature of the outer surface of the waste being baled. However, as more and more material is deposited into the mouth of the apparatus, the flexibility of the belt surfaces 10B, 12B alone is insufficient to accommodate the increased bulk and circumference of material being baled. As a consequence, the second ends defined by the return rollers 10r, 12r are forced apart against the action of the first and second resilient biasing means in the form of springs 18, 20 to increase the size of the entry region 40. Here, the second ends of the conveyors 10, 12 move from positions defined by end stops (not shown) of the first guide 14 and second guide 16, and in so doing compress the springs 18, 20.

To put the above in another way, in the initial positions shown in FIG. 1, the second ends of the first and second conveyors 10, 12 are positioned at inner end stops (not shown) of the first and second guide means 14, 16 and resiliently urged towards those end stops by the springs 18, 20. As more material is deposited into the entry region 40 of the baling apparatus, the bulk of material inside the baling apparatus is at first compressed at the pinch region under natural action of the springs 18, 20 and secondly as more and more material is deposited and the springs 18, 20 compact the material ever more tightly, a point is reached at which the material cannot be compressed any more by the springs and the natural flex of the belts 10B, 12B alone is unable to flex enough to accommodate the increased bale bulk. Therefore, at this point pressure build up against the springs 18, 20, compresses them and forces the return rollers 10r, 12r away from each other along the paths defined by the first and second guides 14, 16.

The intermediate rollers $10i_1$, $10i_2$, $12i_1$, $12i_2$ in preferred arrangements form hinge points of the conveyors 10, 12 and allow the overall formation of the conveyors to adopt a bent configuration. This hinging may be achieved by linking the ends of axles of each roller to axles of its adjacent roller by pairs of plates—using a cycle chain type arrangement.

Figure 7:
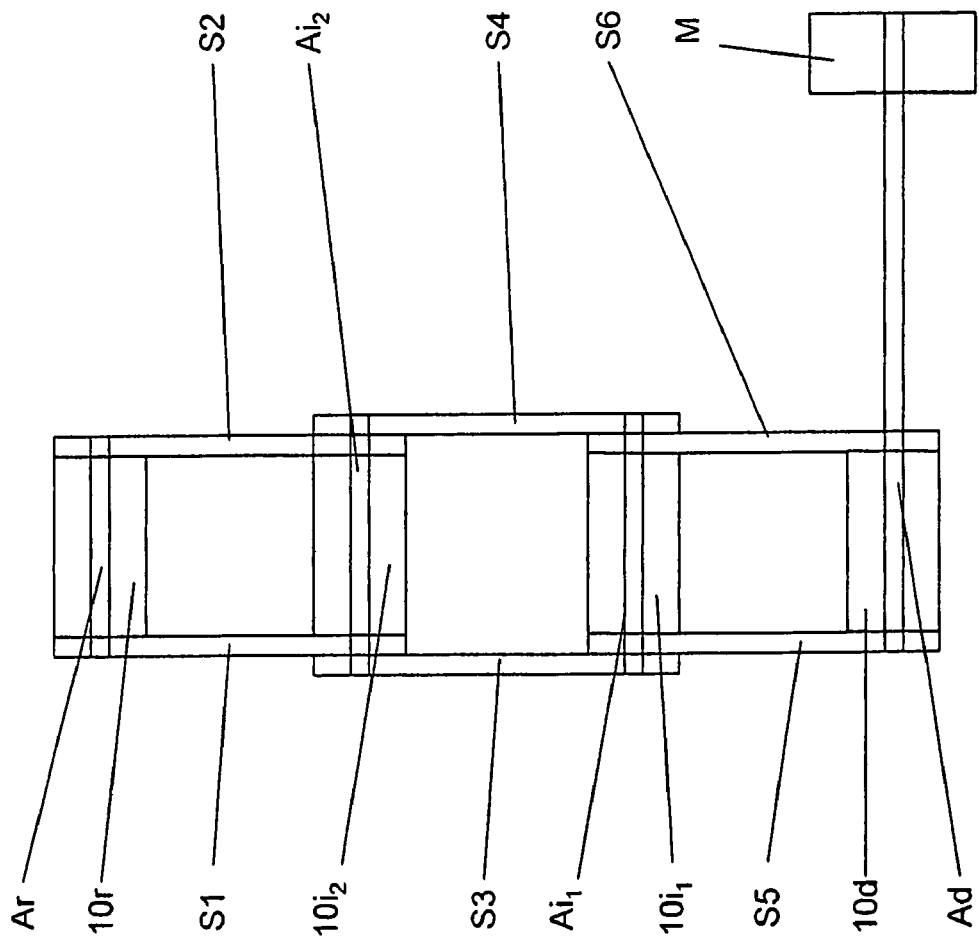
FIG. 7 is a schematic diagrammatical side view of one of the conveyors of the apparatus of FIGS. 1 through 6 shown with the conveyor belt removed.

Referring now in detail to FIG. 7, it can be seen that each roller $10i_1$, $10i_2$, 10d, 10r has a central rotational axis defined by axles Ad, $Ai_1$, $Ai_2$ and Ar. These central rotational axes extend beyond their respective roller to form hinge points for side plates S1-S6. Each side plate links end portions of a pair of adjacent axles to enable the conveyors to articulate. Also shown on FIG. 7 is a motor M which is shown as driving the axle Ad of the driven roller 10d. It will be appreciated that the conveyor 12 may also be constructed in a similar fashion.

While FIG. 7 shows one example of how the conveyor may run over articulated sections, it will be apparent to the skilled man that such articulation is not essential to the invention.

It should be noted that the length of each conveyor 10, 12 does not significantly change to any great extent as more and more material is accommodated between the conveyors 10, 12. Indeed, whilst this is not an essential feature of the invention, distances between adjacent rollers may remain constant.

The bale therefore grows with the influx of more material and the apparatus adapts its configuration to the growing bale in the manner shown by FIGS. 2 through 5.

One particularly important point to note about the arrangements of the above described embodiment of the present invention is the fact that the resilient biasing means formed by the springs 18, 20 in themselves both act to pressurise and compact the material as it is baled and to provide the means by which the compacting region of the apparatus is allowed to expand.

Figure 5:
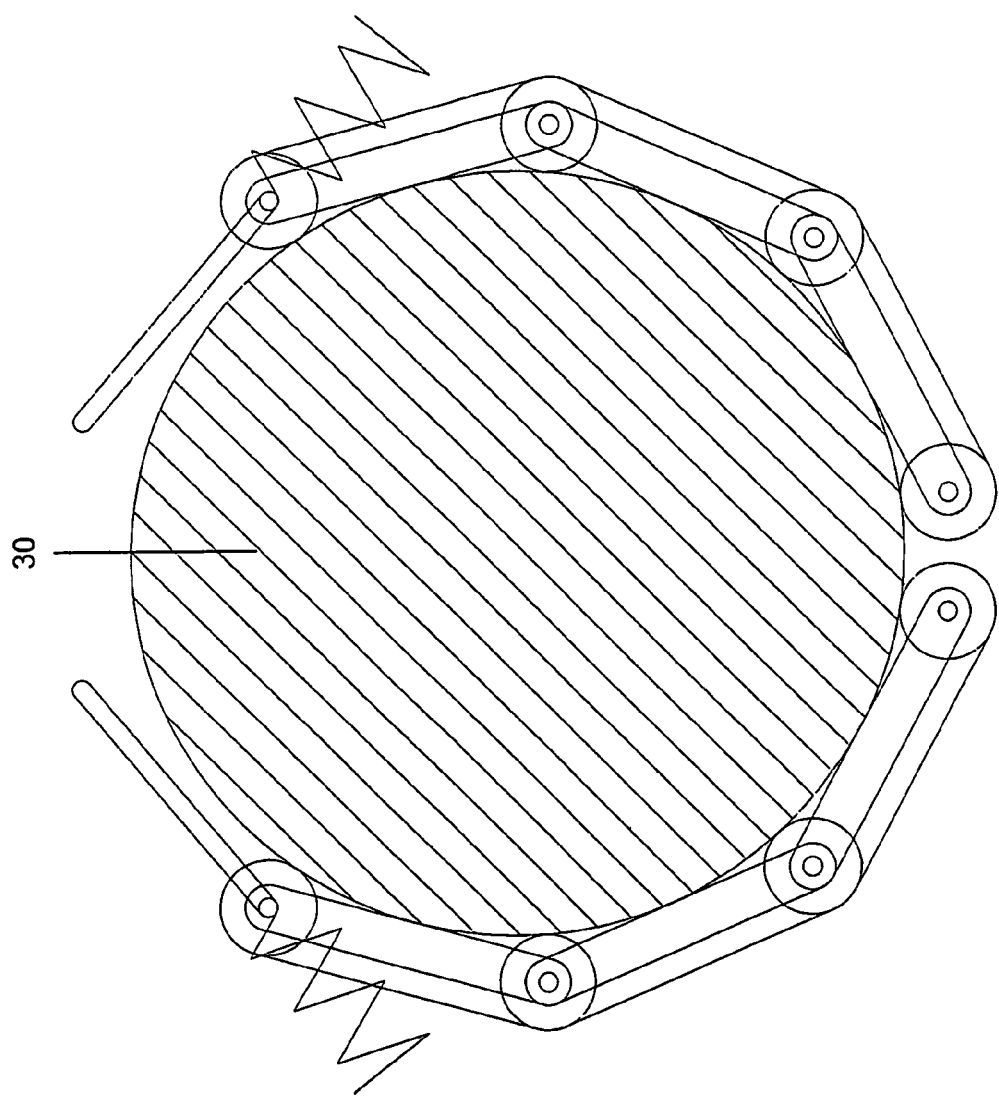

Referring to FIG. 5, it will be noted that at this point the largest possible diameter of baled material is now held within the apparatus and that the return rollers 10r, 12r are now positioned at outer end stops (not shown) of the first and second guides 14, 16. In use, an alarm or signal would then be given to the user of the apparatus to alert to the fact that the bale is at a maximum size and should be removed.

Figure 6:
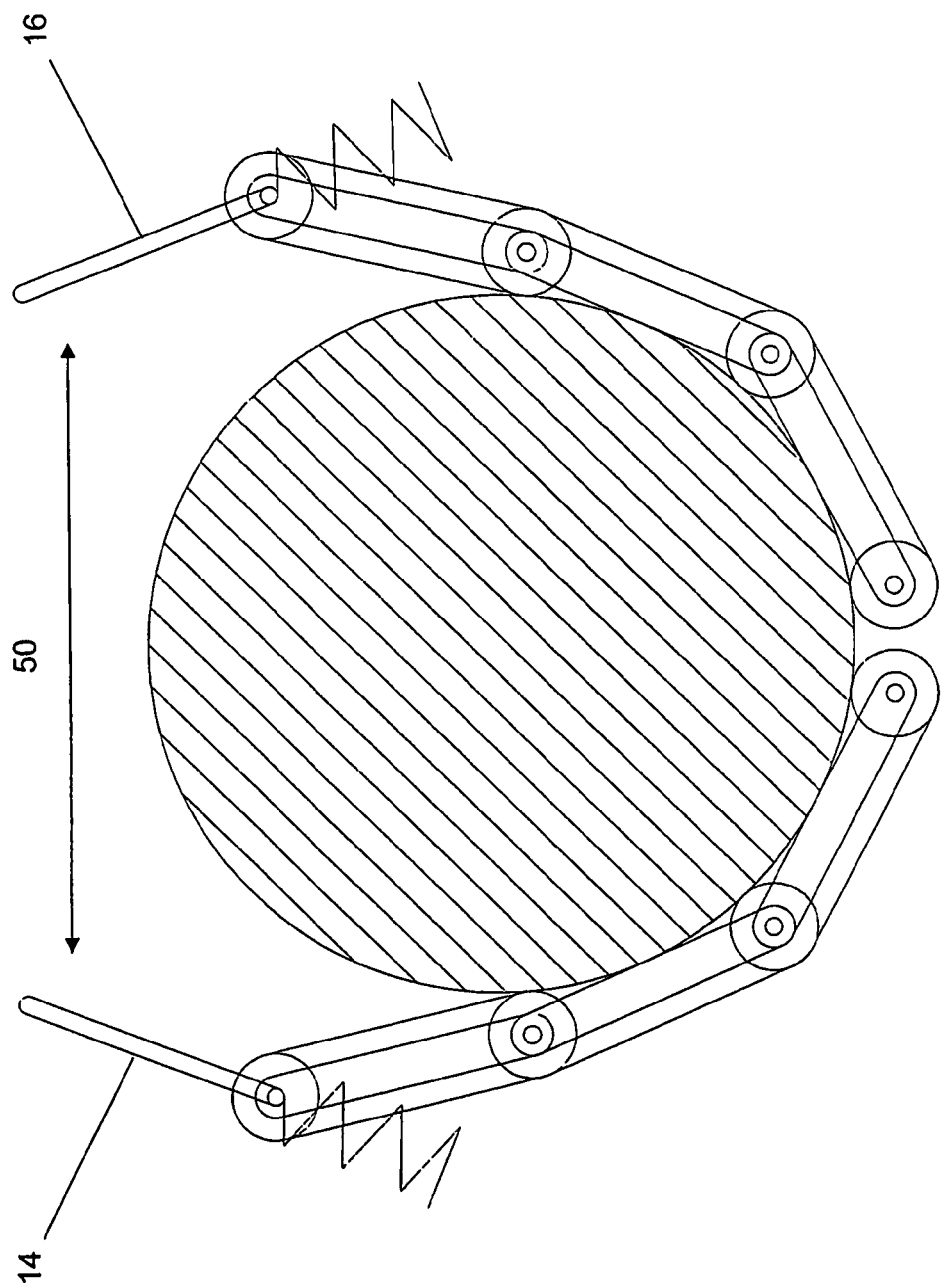
FIG. 6 shows the apparatus of FIGS. 1 through 5 in a configuration in which a complete bale of material may be removed.

Referring now to FIG. 6, there is shown a configuration of the apparatus in which the bale may be removed. Here, the second ends of the conveyors 10, 12 have been spread apart by spreading means to allow withdrawal of the bale 30. The spreading means may for instance, comprise hinge means (not shown) to allow the normally fixed first and second guide means 14, 16 to swing away from their normal configurations and provide a larger mouth region out of which the bale may be removed.

In use of the apparatus of FIGS. 1 through 6, it has been found advantageous to use a starting roll, such a piece of balled up paper, a cardboard roll, a wooden doweling or other similar item (not shown) which can be entered into the space 40 between the two belts 10B, 12B at initial start-up, in order to provide a useful form around which the bale will automatically construct.

Another possibility is to provide deflector plates or rollers to retain an initial mass of the bale adjacent to the location of the intermediate roller (or rollers).

From the above, the general configuration of one embodiment of a baling apparatus has been described. It will be appreciated that a number of features have been omitted from the description and the drawings, in order to demonstrate the principles of baling applied. It will be noted for instance, that the driven rollers 10d, 12d do not have their associated motors shown. However, the skilled man will realise that these driven rollers 10d, 12d may be driven by an either internally mounted or externally mounted motor and such drive may be by means of direct drive, belt, chain, etc. It will also be appreciated that whilst no apparatus chassis is shown, the presence of such a chassis or housing is implicit. Requirements of the chassis being such that the various different described integers are supported in a way which allows the apparatus to function in the manner described.

Referring now to FIGS. 8A through 8G, a second embodiment of baling apparatus is shown schematically and will be described now.

Referring to FIGS. 8A to 8G, the apparatus of the second embodiment comprises similar elements to the elements of the first embodiment, but instead the first and second conveyor mechanisms designated 100, 120 are arranged in an initial Y-type formation, instead of a V-type formation and three rollers instead of four are employed by each conveyor.

In more detail, the apparatus of the second embodiment comprises a first conveyor mechanism 100, and second conveyor mechanism 120. In analogous fashion to the first embodiment, each of the first and second conveyor mechanisms comprise driven rollers 100*d*, 120*d*, return rollers 100*r*, 120*r* and intermediate rollers 100*i*, 120*i*. In contrast to the first embodiment only one intermediate roller is provided for each of the first and second conveyor mechanisms 100, 120. Biasing mechanisms are provided associated with the intermediate rollers and return rollers. Here, the biasing mechanisms conveniently comprise compression springs and guides 180*i*, 200*i* for the intermediate rollers 100*i*, 120*i* and springs and guides 180*r*, 200*r* for the return rollers 100*r*, 200*r*—it will be appreciated though that other biasing means such as powered cylinders (gas, air, hydraulic for instance) and guide means (such as sliders, slots, linkages) could equally be employed. Each of the first and second conveyor mechanisms also comprise belts 100B, 120B.

Figure 8A:
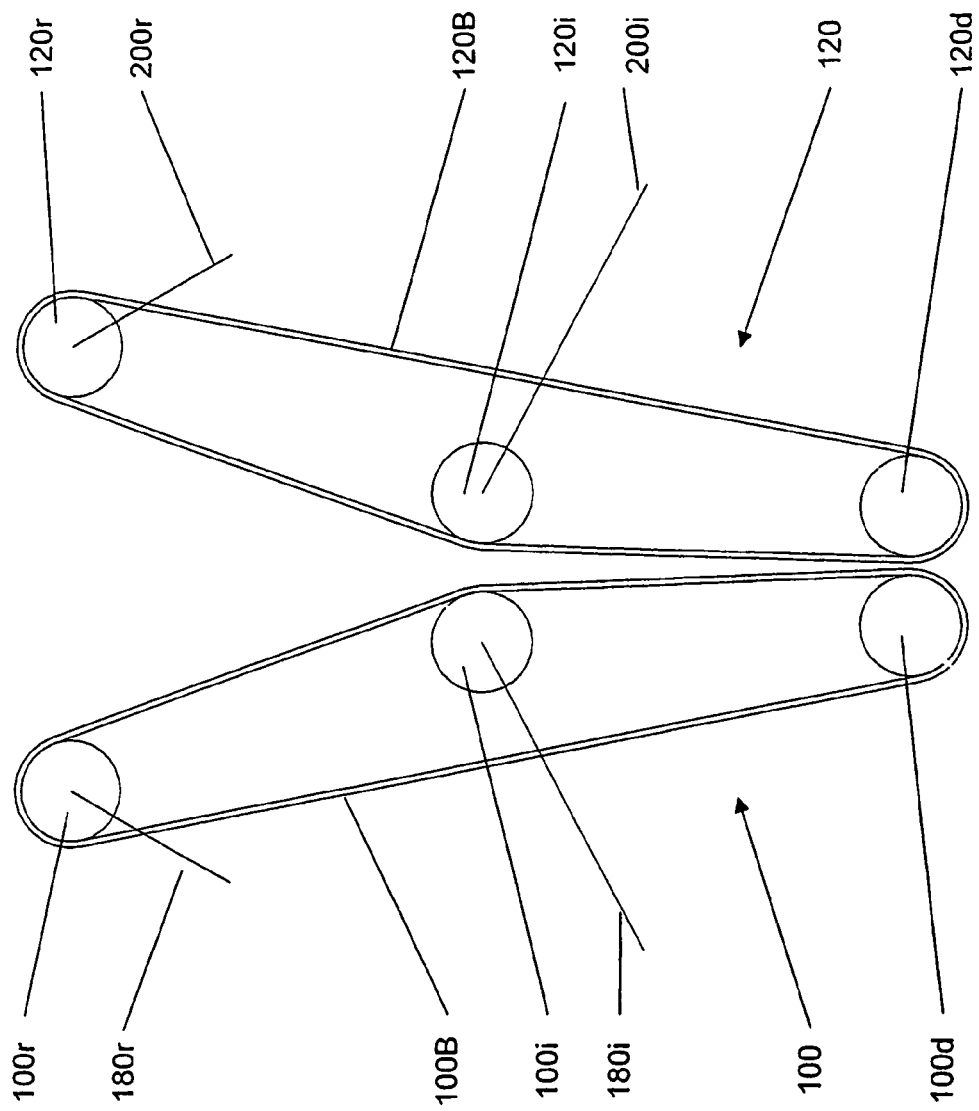
FIGS. 8A through 8J show a baling apparatus according to a second embodiment of the invention, the baling apparatus being shown in various configurations according to a quantity of material being baled and further showing how a complete bale of material may be removed.

Referring in detail to FIG. 8A, the apparatus of the second embodiment is shown in an initial configuration prior to the introduction of waste material. Here, it would be appreciated that of course the belts 100B, 120B are arranged to counter rotate in the same manner as the belts 10B, 12B of the first embodiment, such that material held between them is rolled.

Figure 8B:
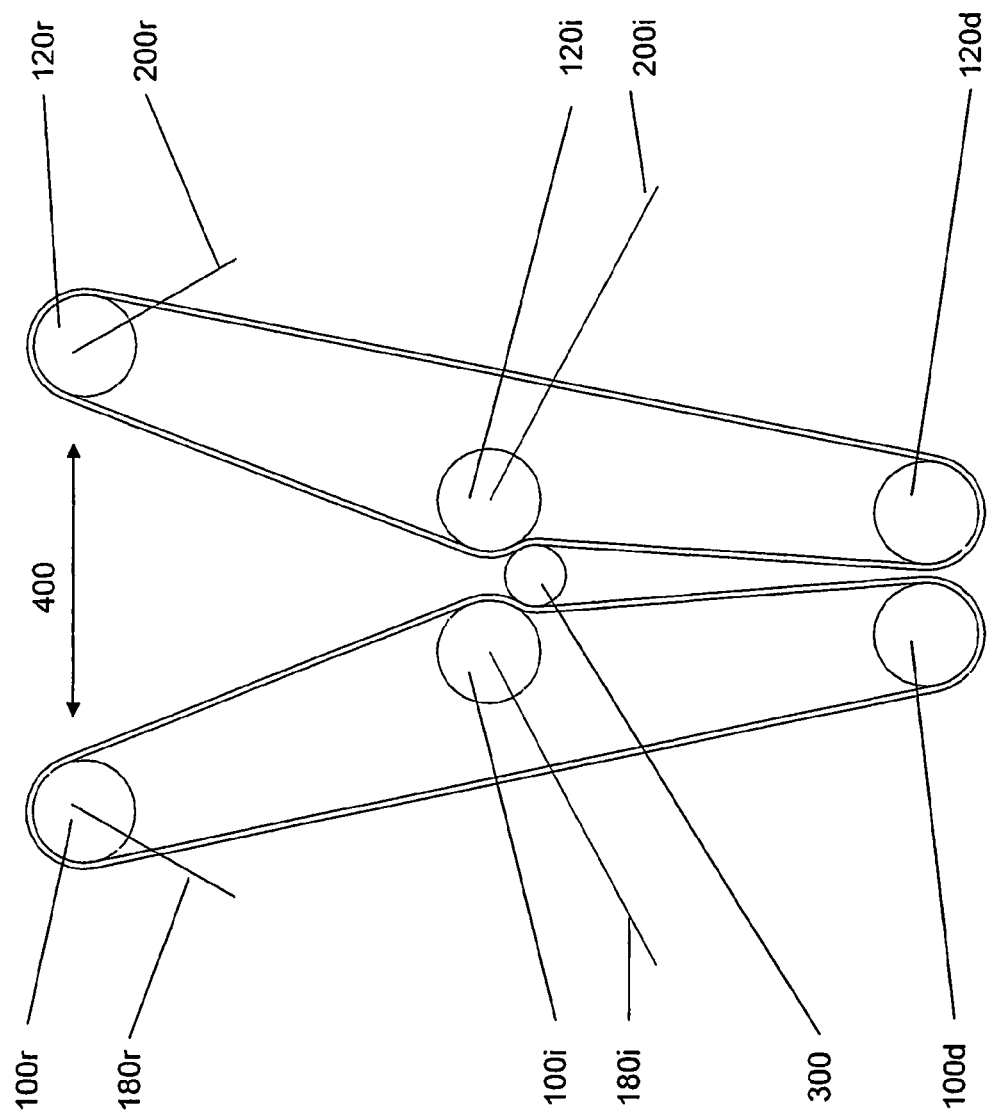

Referring to FIG. 8B, a first stage in a baling operation is shown. Here, material has been introduced and a roll started. Due to the fact that the driven rollers 100*d*, 120*d* are fixed in position relative to one another, and the intermediate rollers 100*i*, 120*i* are spring biased into position so as to urge them toward one another, material introduced into a gap 400 at the upper ends of the first and second conveyors will, as it grows, naturally rise to a point just below the intermediate rollers 100*i*, 120*i*, such that as the bale grows, the two intermediate rollers are forced gradually apart with the compression springs being further linearly compressed and moving from a position where the associated axle of the roller is at an inner end stop position of the guides to a position slightly displaced from the inner end stop. It will be noted here that as the springs are further compressed the material being rolled is further compacted so as to form a compacted and initially small bale 300.

Figure 8C:
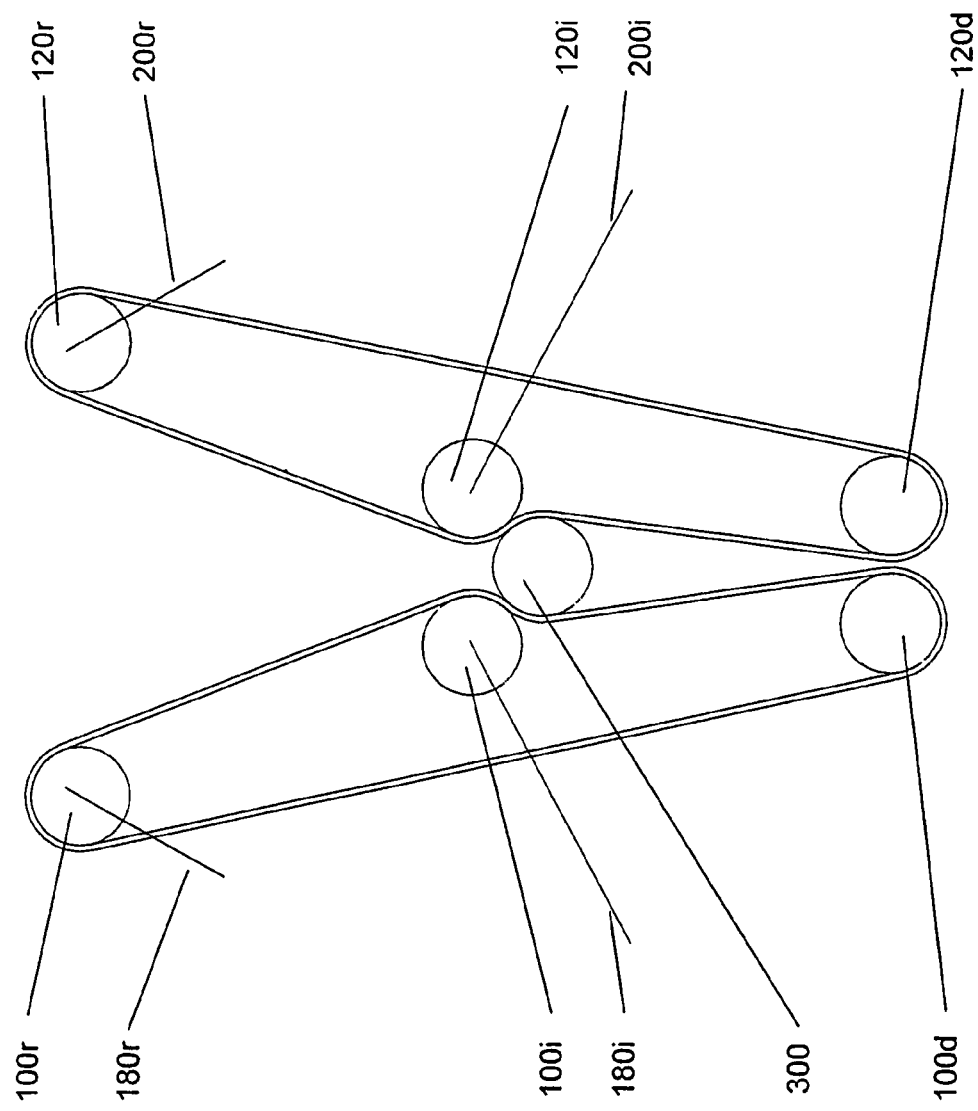

FIG. 8C shows a second stage in bale formation, where it can be seen that the bale has grown to a point at which the two intermediate rollers 100*i*, 120*i* begin to be forced apart and their central axes begin to travel along the path defined by the resilient biased means 180*i*, 200*i* comprising springs and guides.

Figure 8D:
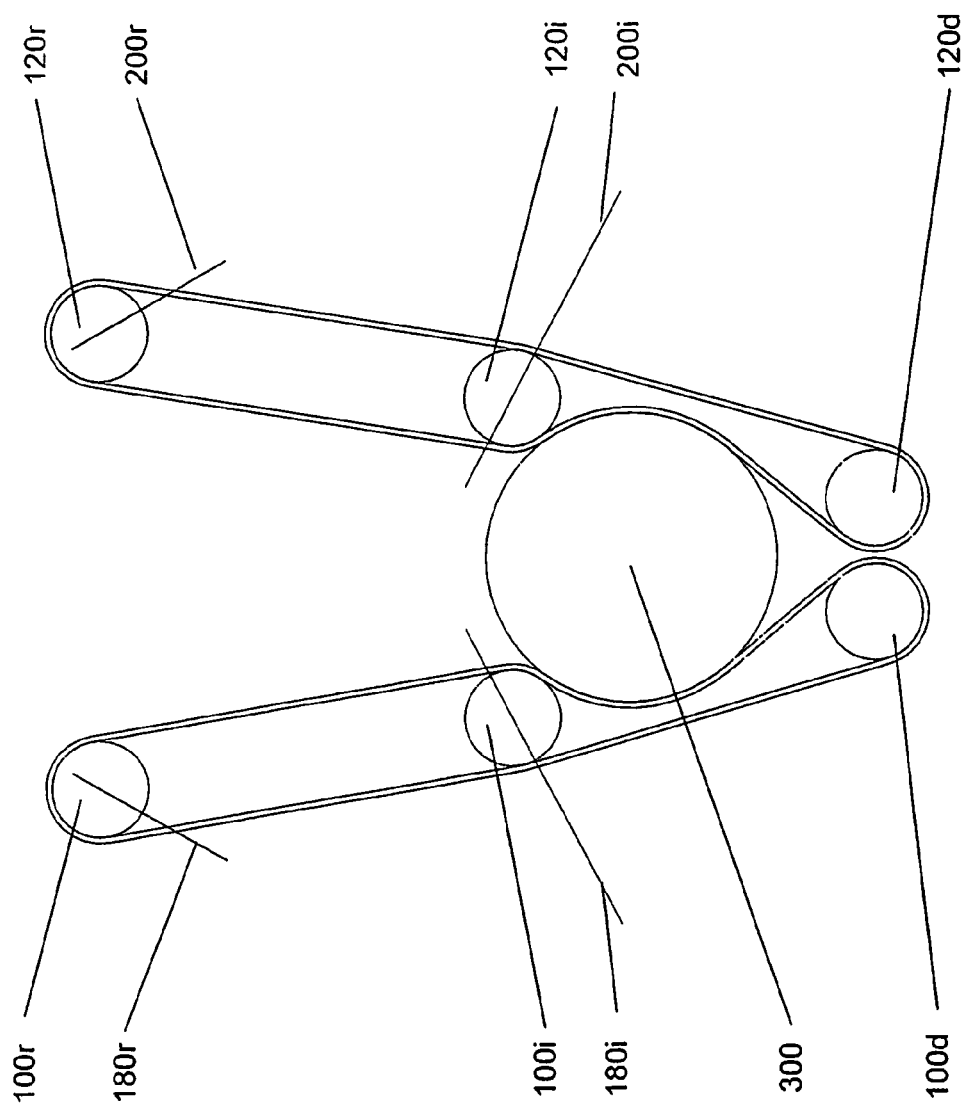

As the size of the bale 300 increases, intermediate rollers 100*i*, 120*i* are forced further and further apart as shown in FIG. 8D and the return rollers 100*r*, 120*r* are also forced to begin travel along the axes defined by their associated resilient biasing means 180*r*, 200*r*. This latter travel starts to open up the entry area 400 of the baling mechanism to make it wider.

Figure 8E:
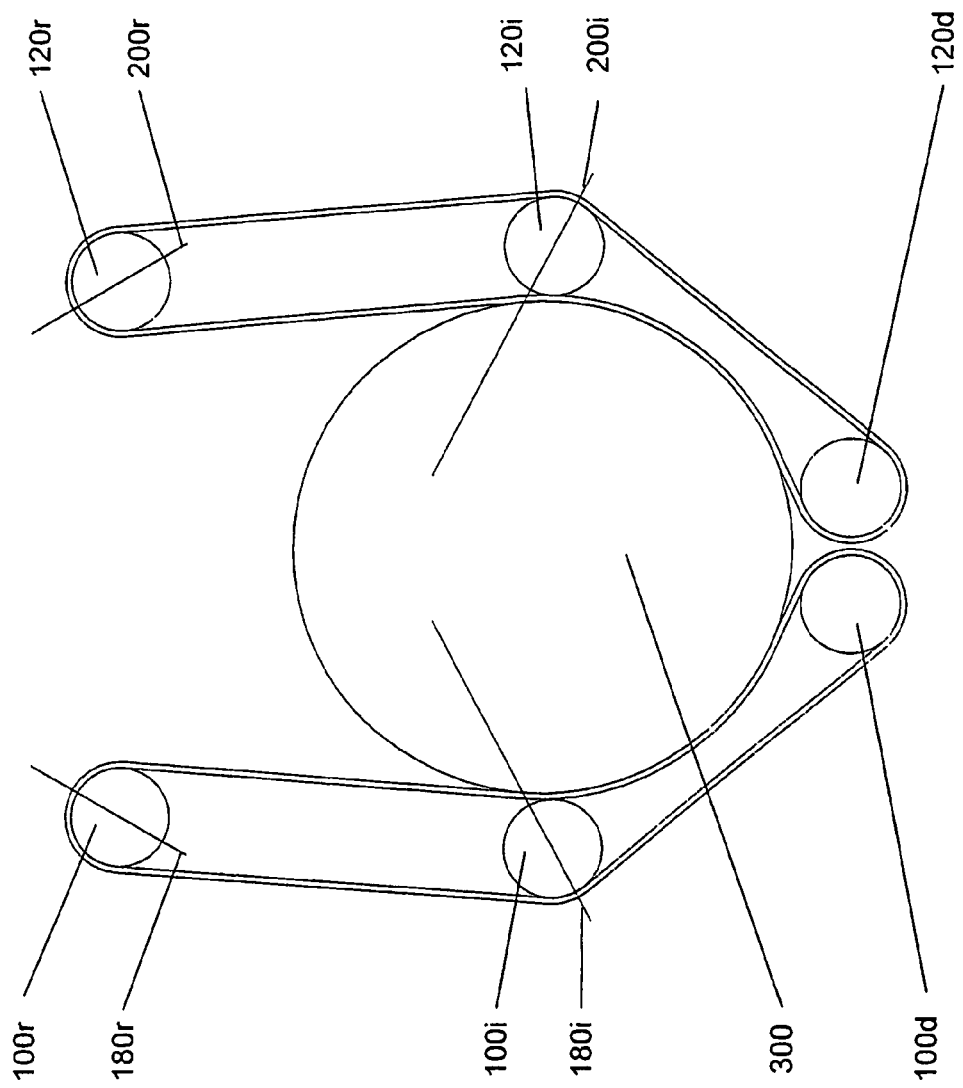
Figure 8F:
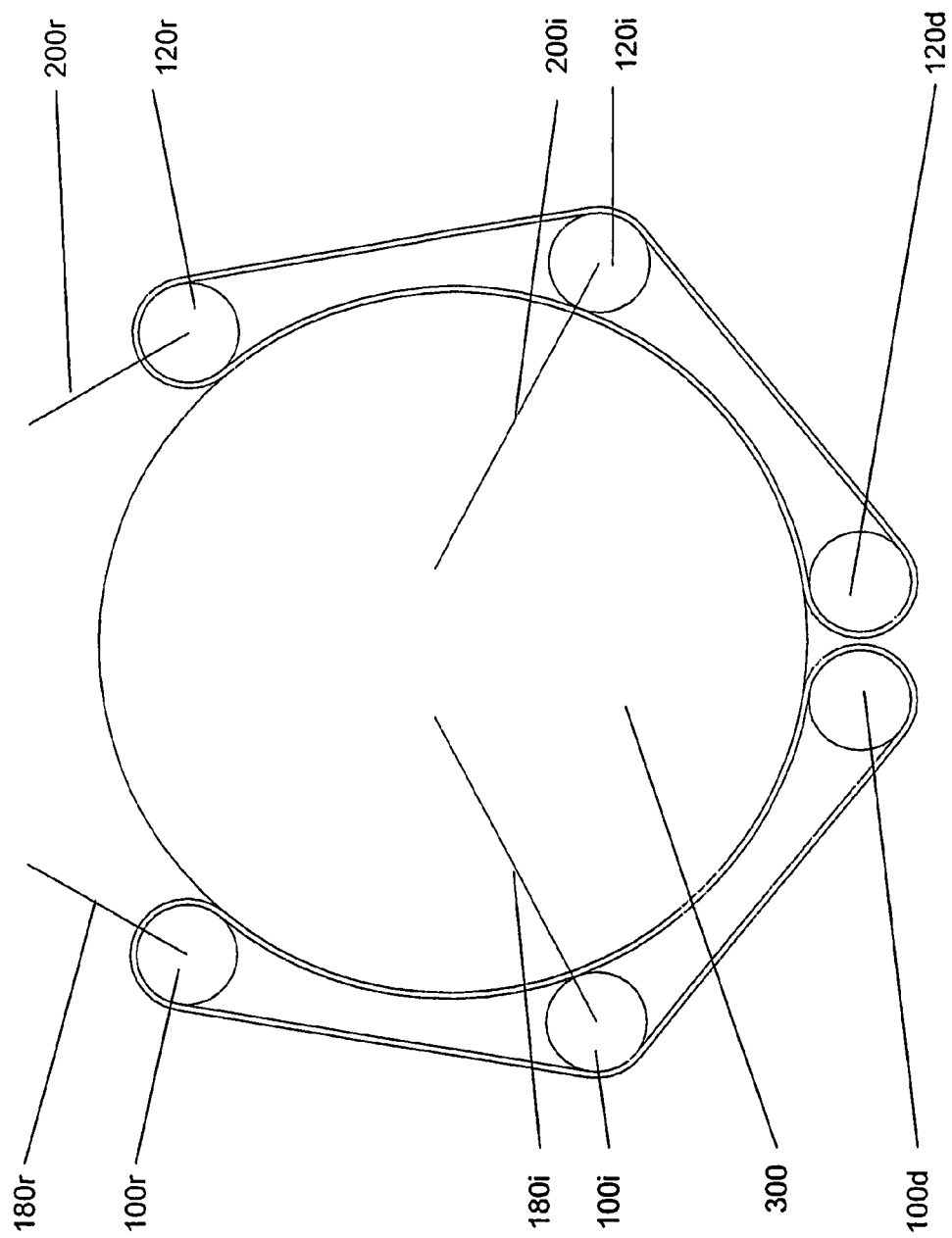

In FIG. 8F, it can be seen that the bale 300 has now reached a maximum size, in which the intermediate rollers, 100*i*, 120*i* have reached the end of their travel as defined by the central longitudinal axis of the guide parts of the biasing means 180*i*, 200*i* and, similarly, the return rollers 100*r*, 120*r* are in their extreme positions as defined by outer end stops (not shown) of associated biasing means 180*r*, 200*r*.

Figure 8G:
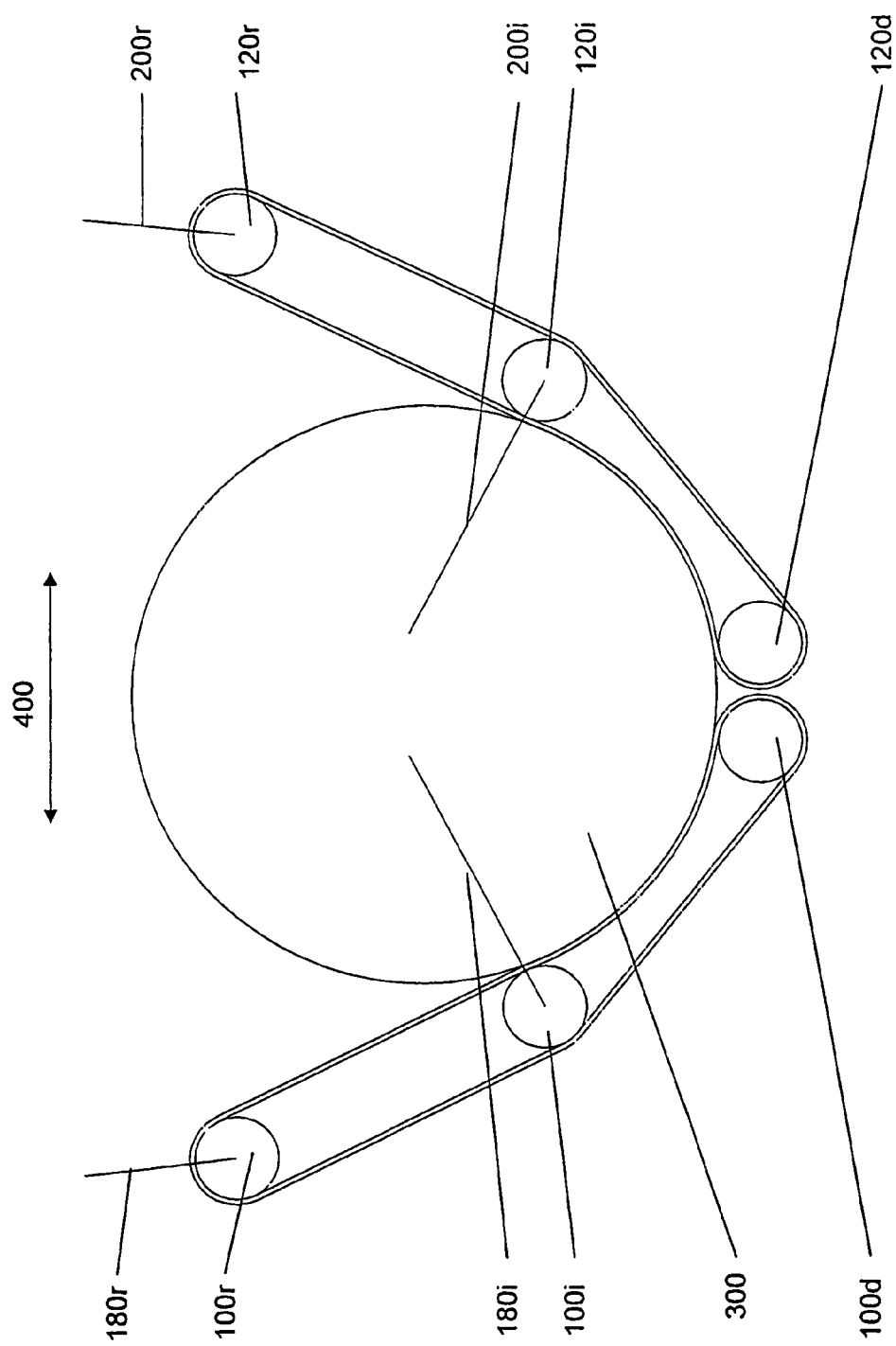

Referring now to FIG. 8G, a first schematic representation is shown by which the bale 300 may be removed from the baling apparatus. In this illustration, it can be seen that an arrangement is provided which allows the two return rollers to swing out, away from a central line of the baling apparatus to increase gap 400 sufficiently to remove the bale 300 from the top of the apparatus. This arrangement may be realised by associating the left side conveyor mechanism 100 with a left side chassis (not shown) and the right side mechanism 120 with a right side chassis (not shown) and hinging the left and right side chassis together adjacent the drive rollers 100*d*, 120*d*.

Figure 8H:
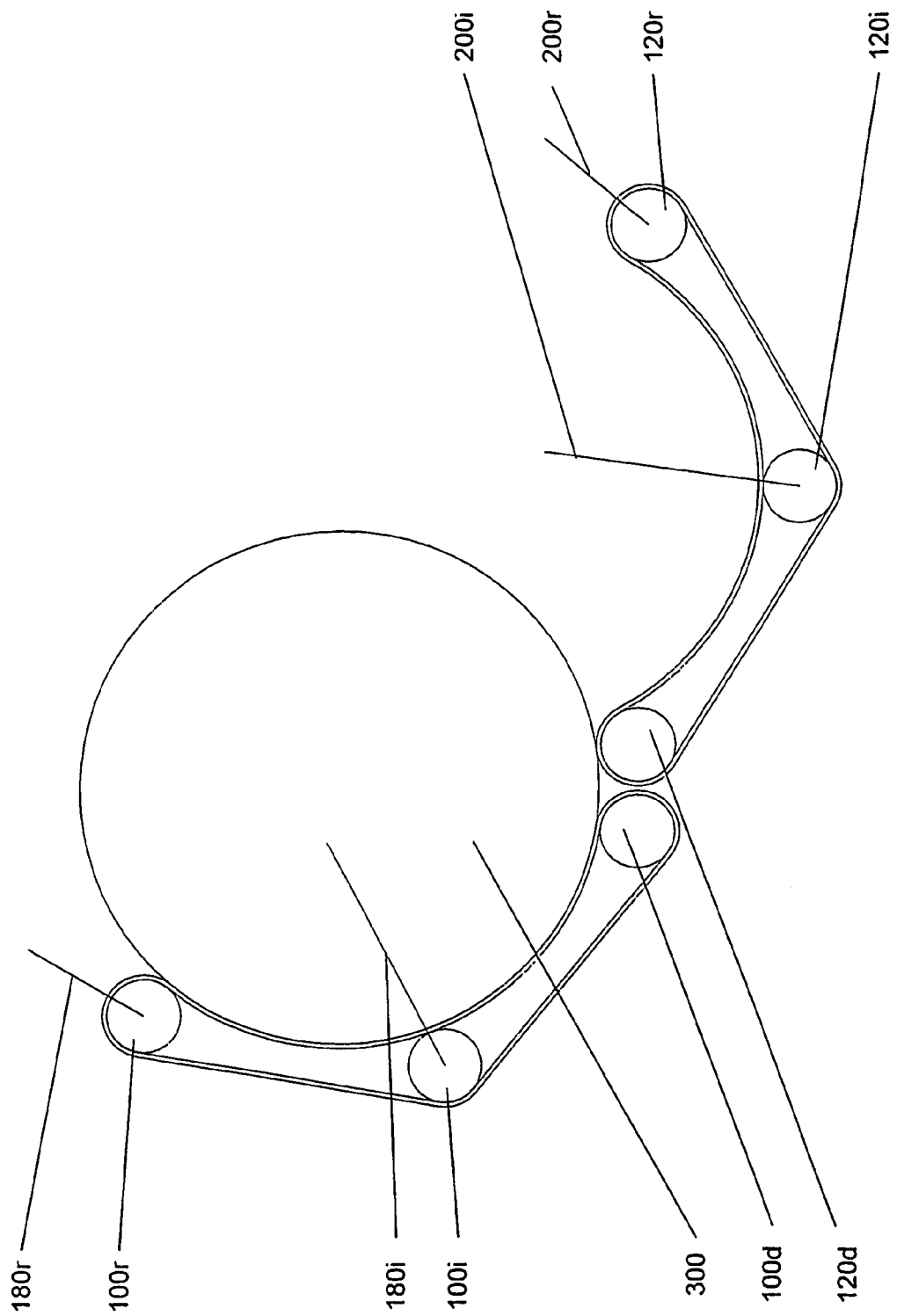

FIG. 8H shows an alternative arrangement to FIG. 8G and shows a possibility in which the whole of one side of the baling apparatus may be swung away from the other side so as to allow side exit of a completed bale 300. Here, a right side of the apparatus is shown being swung away from a stationary left side, about a pivot defined, approximately, by the central axis of the driven roller 120*d* of the second conveyor mechanism 120.

Figure 8I:
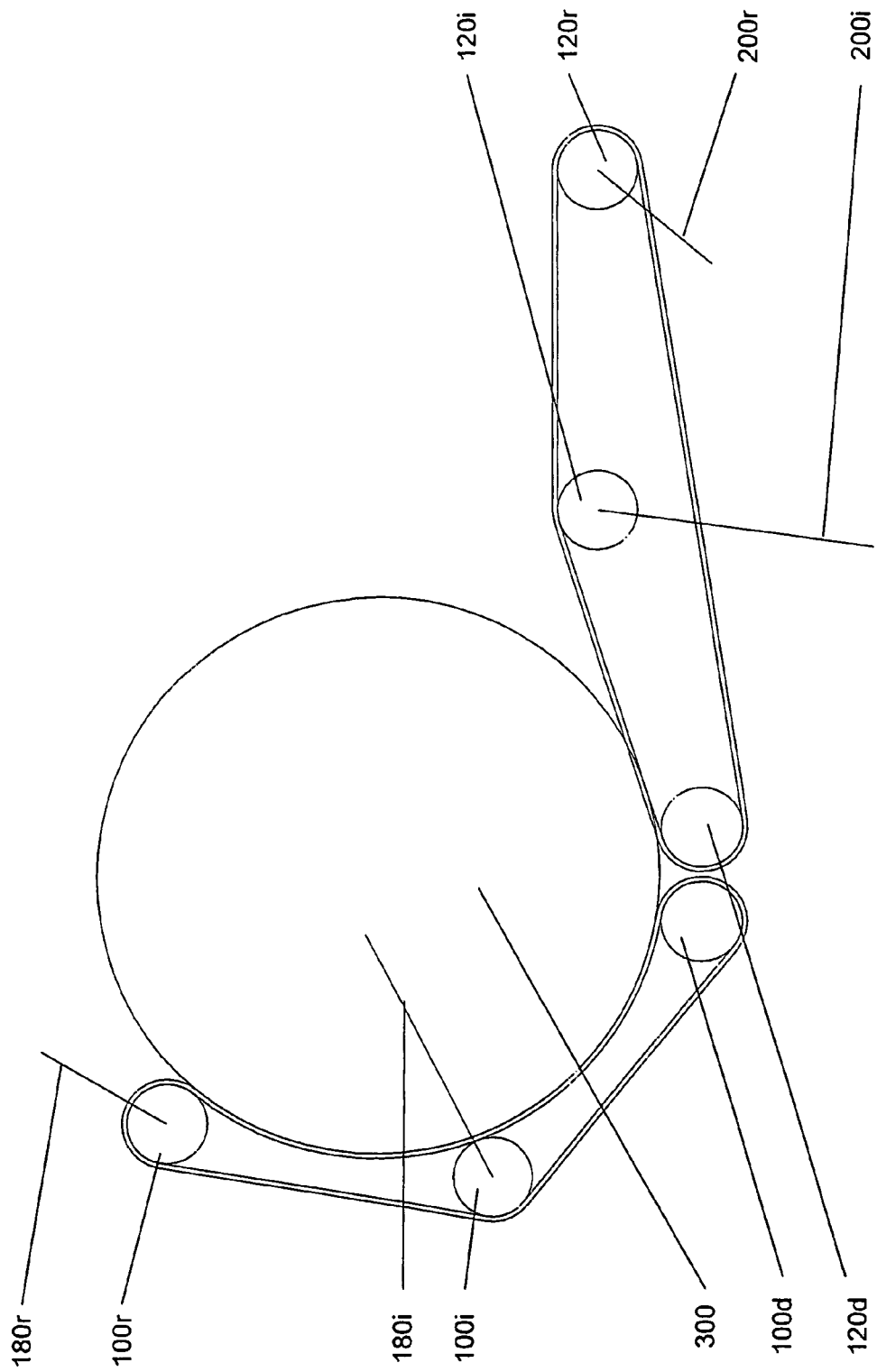
Figure 8J:
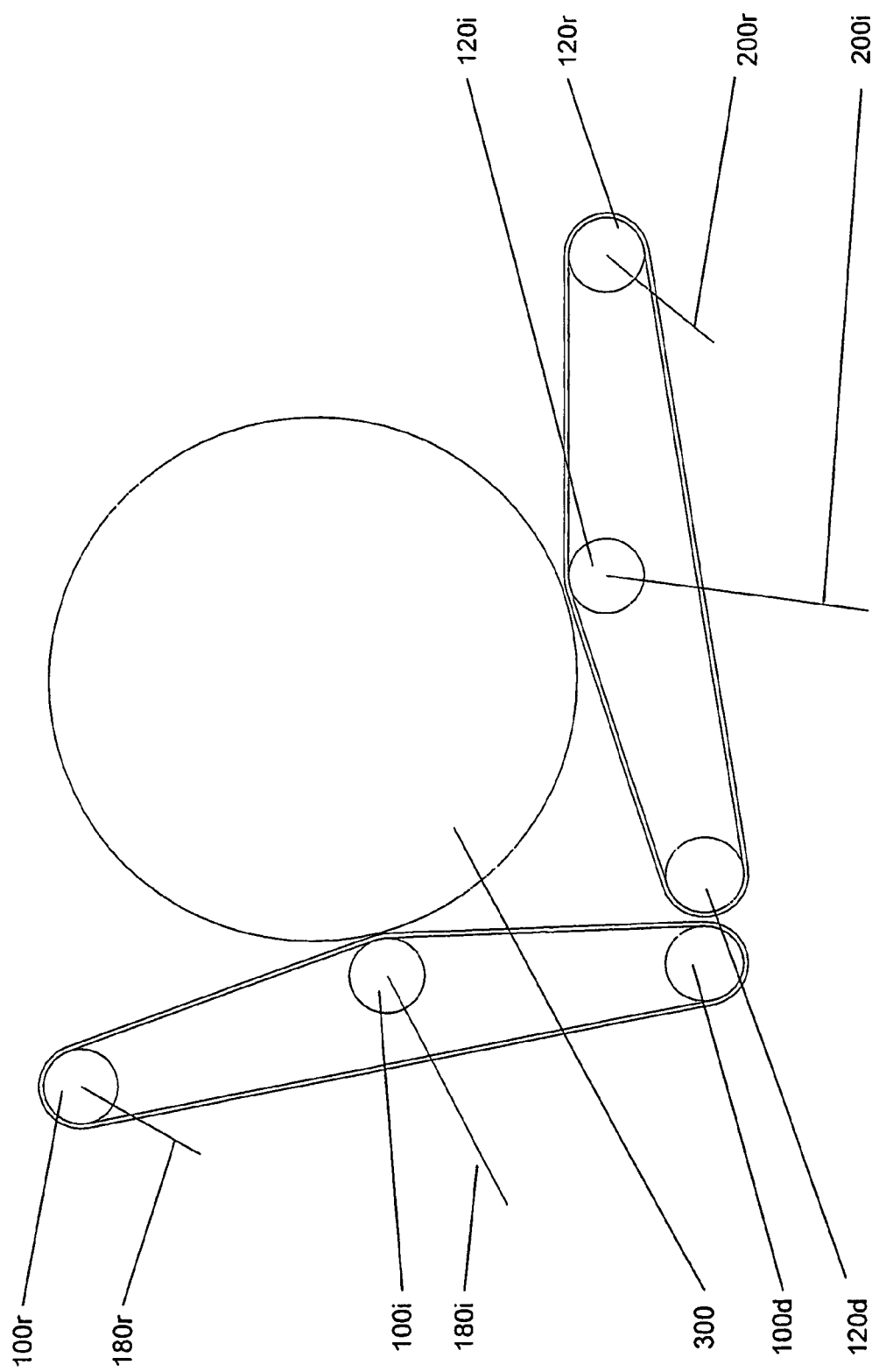

FIG. 8I shows the arrangement of 8H in which intermediate roller 120*i* is allowed to move along the axis of its associated guide to spring up. In this arrangement, as a right side of the machine is swung away from a left side the intermediate roller 120*i* is allowed to move upwardly along the axis defined by intermediate biasing means 200*i* and this may provide an easy ramped surface defined by the configuration of belt 120B, to help an operative easily and controllably remove the bale 300 from the apparatus. Indeed, a removal operation may further be assisted by allowing, in a stage 8J subsequent to stage 8I, the intermediate roller 100*i* of the left side of the apparatus to move along an axis defined by intermediate biasing means 180*i*, so as to help urge the bale 300 out from within the machine.

It will be appreciated that the arrangements of FIG. 8A to J were described in a schematic, illustrative fashion. In FIGS. 9 through 13, more details of a practical mechanism for implementing the arrangements shown in FIG. 8A onwards will be described.

Figure 9:
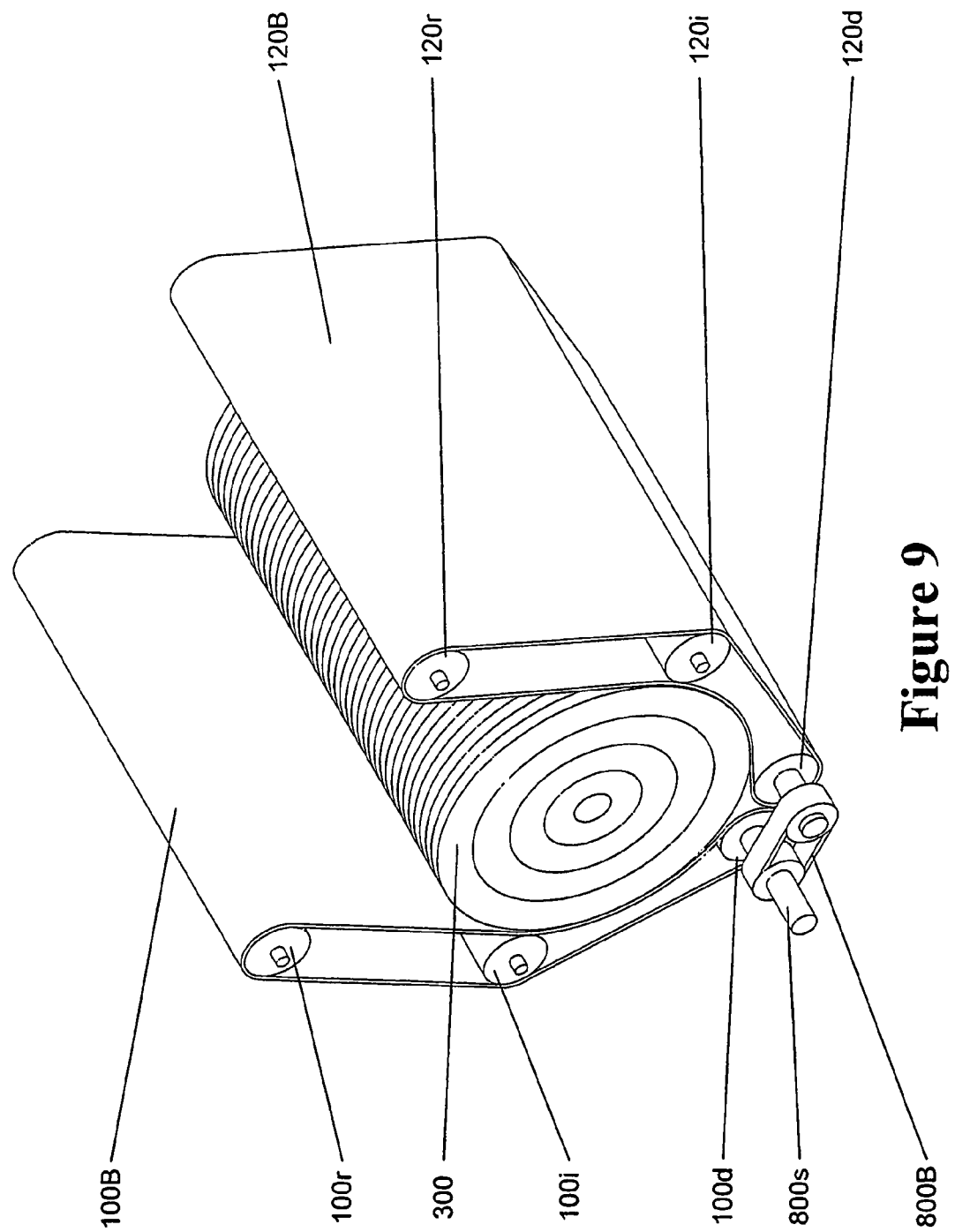
FIG. 9 is a view similar to the view of FIG. 8E, but showing more detail of rollers and drive mechanisms.

Referring now to FIG. 9, a view similar to that shown in FIG. 8E of the second embodiment is shown, but showing in three dimensions the configurations of the various rollers 100*d*, 100*i*, 100*r*, 120*d*, 120*i*, 120*r* and also showing a drive mechanism 800 comprising a driven shaft 800*s*, and a belt mechanism 800B linking the two driven rollers 100*d*, 120*d* to each other and driving them in counter rotation.

Figure 10:
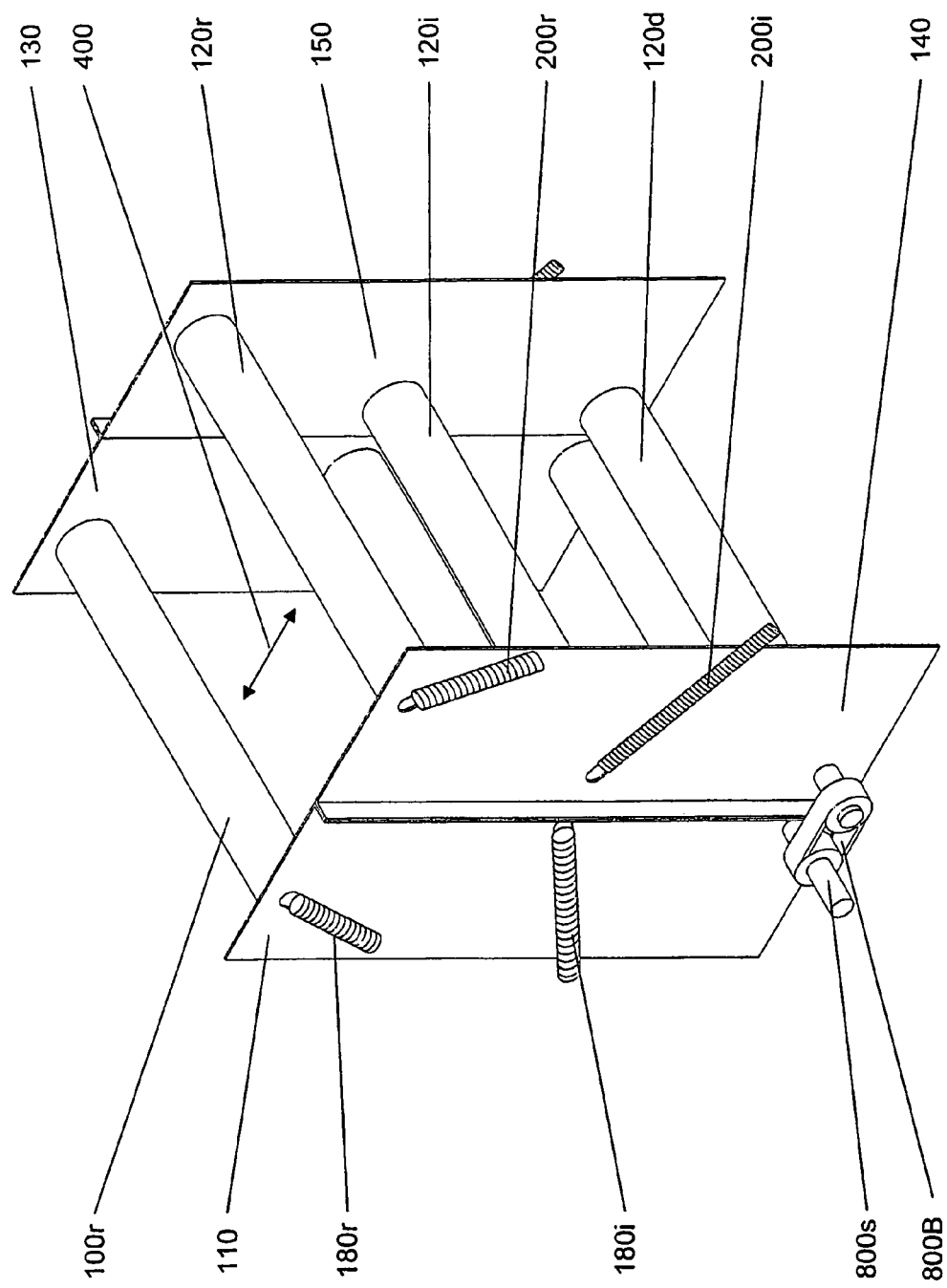
FIG. 10 shows a chassis arrangement with details of individual rollers, biasing and drive means.

FIG. 10 shows a chassis arrangement and details of a springing arrangement for maintaining the various different rollers of the second embodiment in proper relation to one another.

In more detail, the chassis arrangement of FIG. 10 includes a front left chassis part 110, a front right chassis part 140, a rear left chassis part 130 and a rear right chassis part 150. Here, the biasing means 180*r*, 180*i*, 200*i*, 200*r* comprise springs arranged in compression, so as to urge return rollers 120*i*, 120*r* toward inner end stops defining an entry region 400 of the apparatus, whilst the springs 180*i*, 200*i* urge the intermediate rollers 100*i*, 120*i* toward closely spaced apart central positions. The isometric view of FIG. 10 also shows that the configuration of the various different biasing means 180*i*, 180*r*, 200*i*, 200*r* on the front two chassis sides 110, 140 is mirrored by similar placement of biasing means on the rear two chassis plates, 130, 150.

Figure 11:
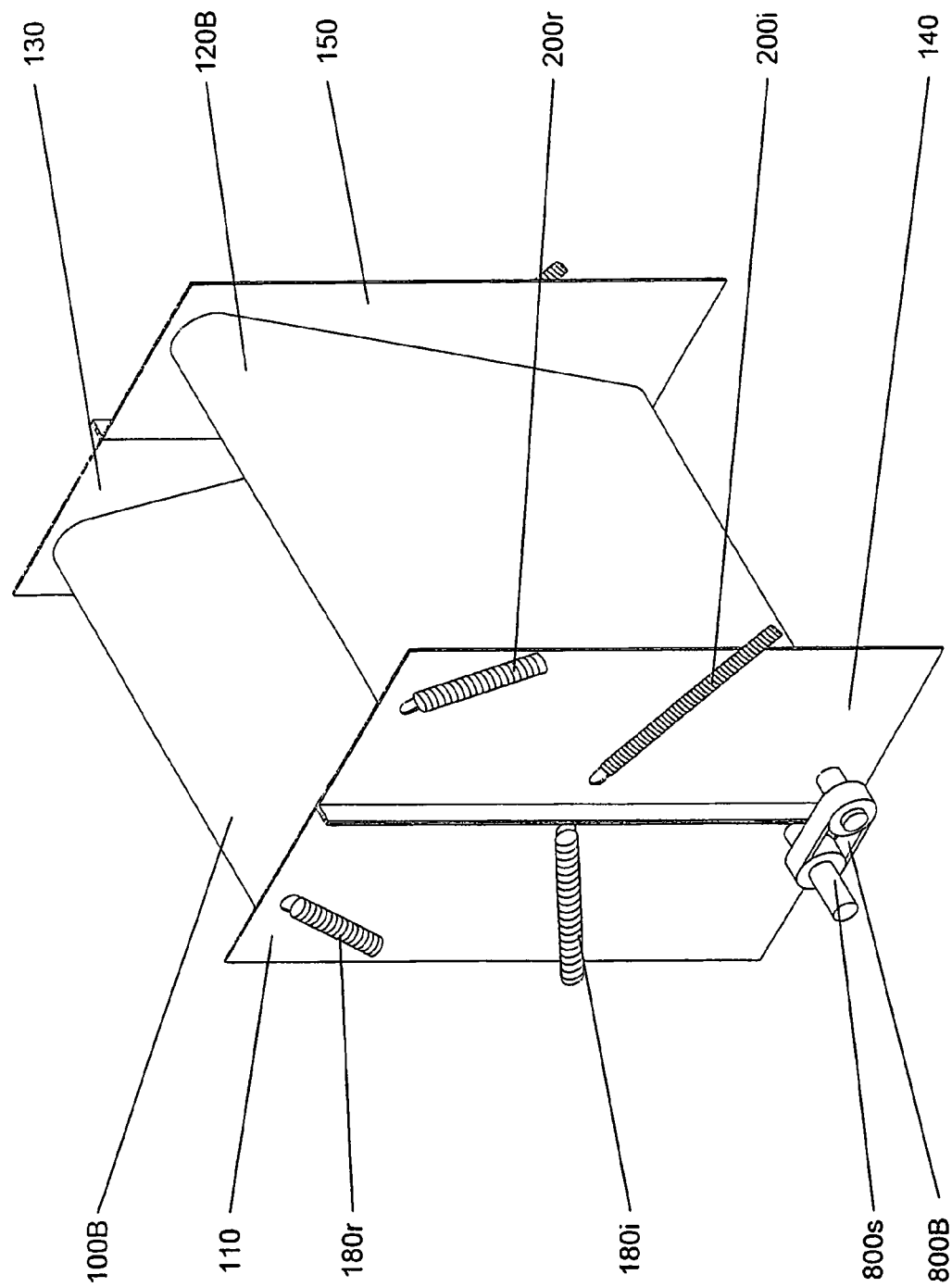
FIG. 11 shows the chassis arrangement of FIG. 10, but complete with drive belts.
Figure 12:
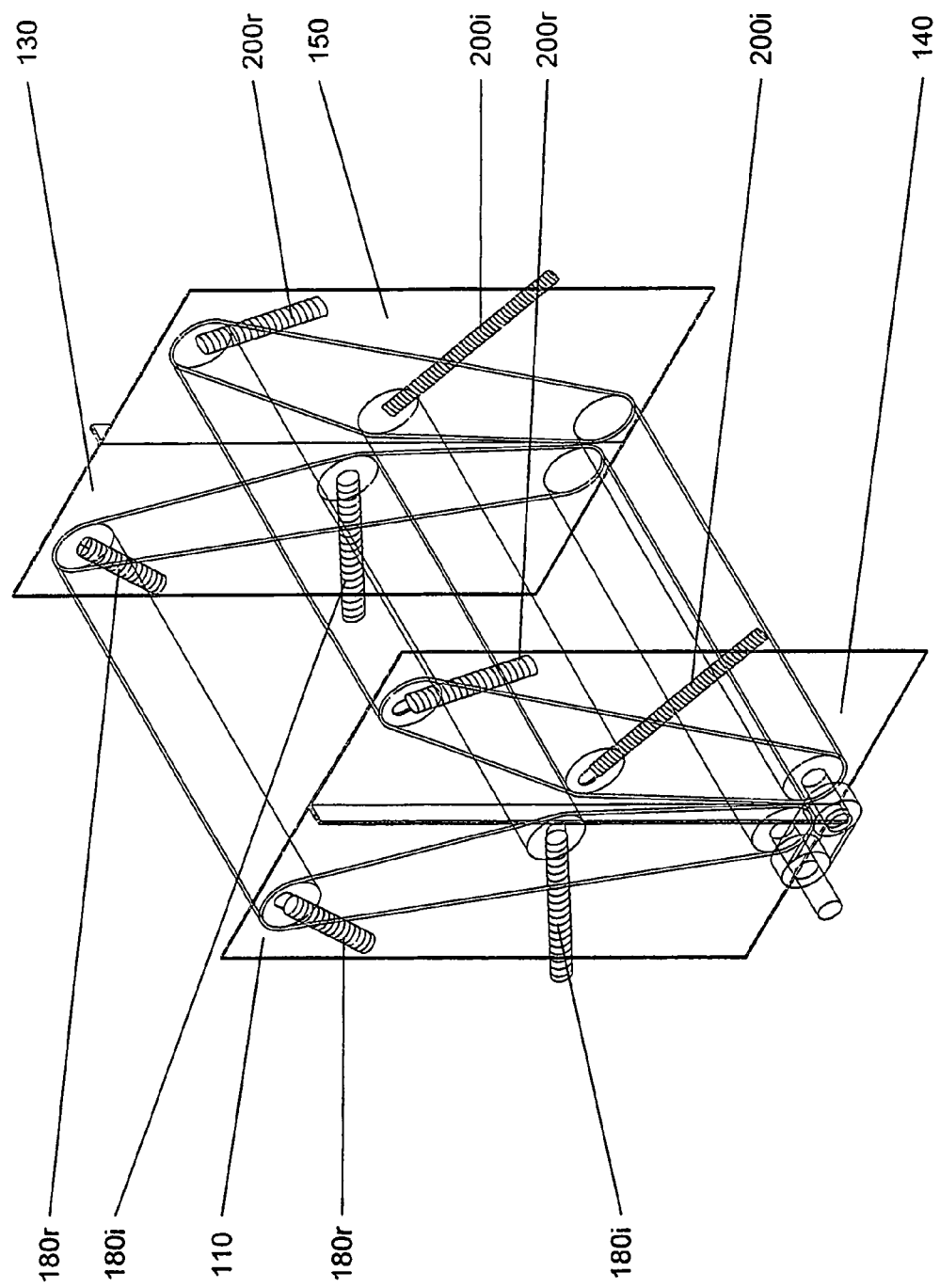
FIG. 12 is a view showing hidden detail of the arrangements of the FIG. 11 embodiment.
Figure 13:
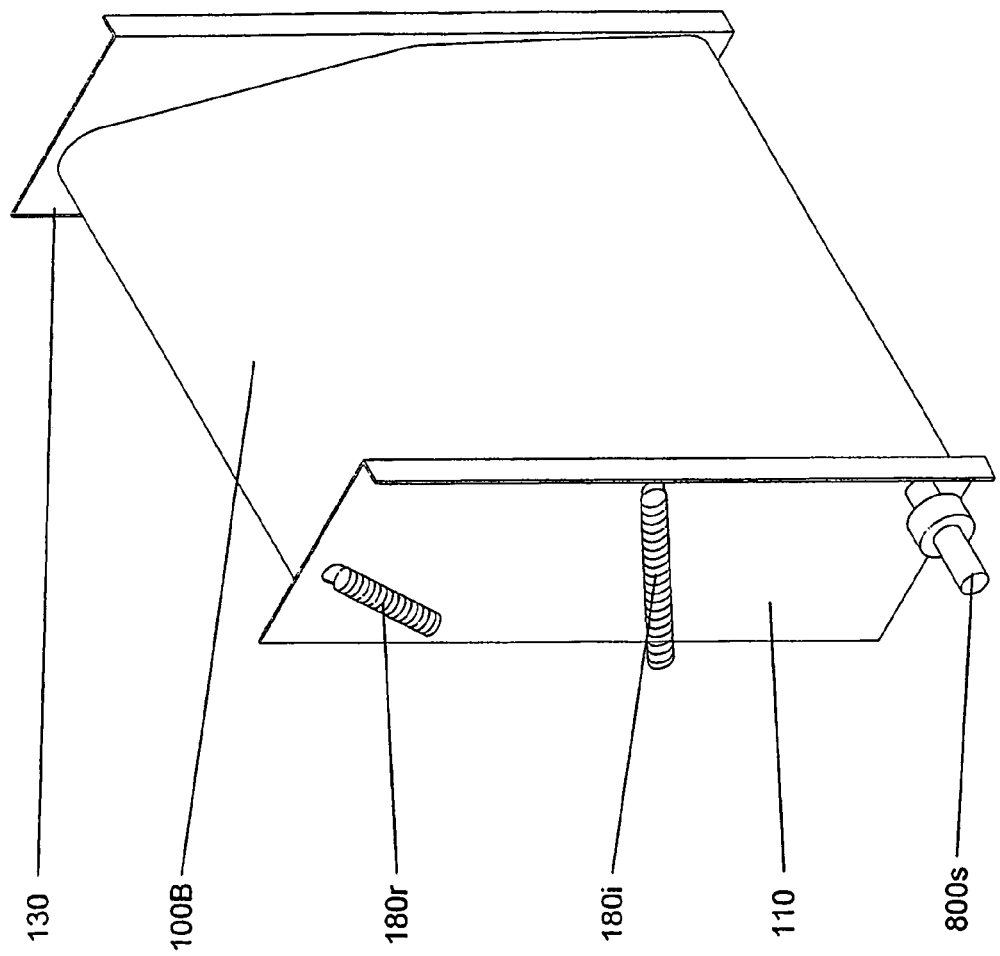
FIG. 13 shows a view of a left hand part of the chassis arrangement, roller and belt arrangement.

FIG. 11 shows the chassis arrangement of FIG. 10, with the belts 100B, 120B in place, so as to form a Y configuration between the left and right sides, whilst FIG. 12 shows the hidden detail of springs and rollers, and FIG. 13 is a view showing the front and rear of the left side of the arrangements, with chassis plates 110, 130 and belt 100B.

Figure 14A:
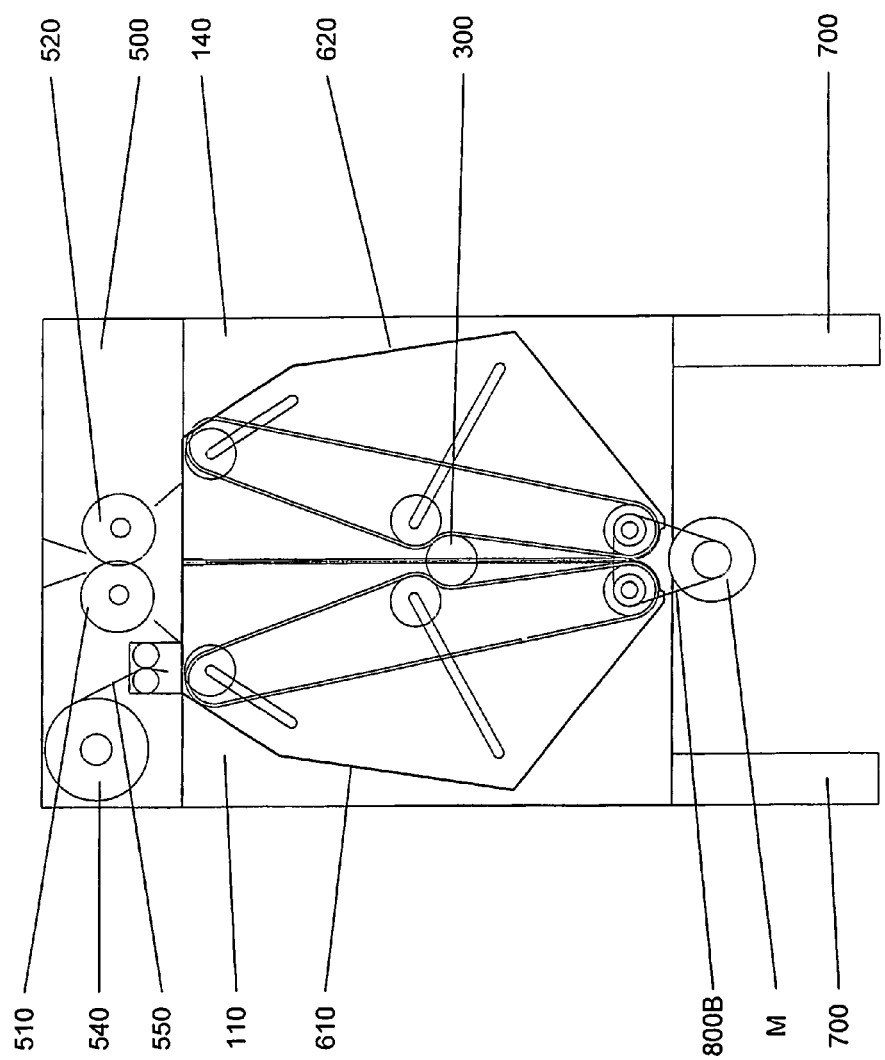
FIGS. 14A through D show the essential features of a baling machine in accordance with an embodiment of the invention in various configurations.

Referring now to FIGS. 14A through 14D, a fully built up baling machine incorporating the principles explained in relation to FIG. 8A through 8J and the mechanism described in FIGS. 9 through 13 is shown. Here, in this machine the front left chassis plate 110 and front right chassis plate 140 are shown, the individual rollers, belt and biasing means as previously described are also shown (here, it will be noted that this view actually shows hidden detail and that an external view of the baling apparatus would actually obscure these internally located mechanisms). Also, there is shown an internal profile 610, 620 to the left and right sides of the conveyor mechanism. These internal profiles 610, 620 may comprise back plates running the full depth of the baling machine and their use and operation will be described later. Also shown in FIG. 14A is a motor M, with drive belt 400B for driving the two driven rollers, and a top, entrance part of the machine 500 is shown, this entrance part also includes entry rollers 510, 520 for regulating an intake flow of material and includes a bale wrapping mechanism 540 with bale wrap material 550. The entire apparatus stands on legs 700.

Figure 14B:
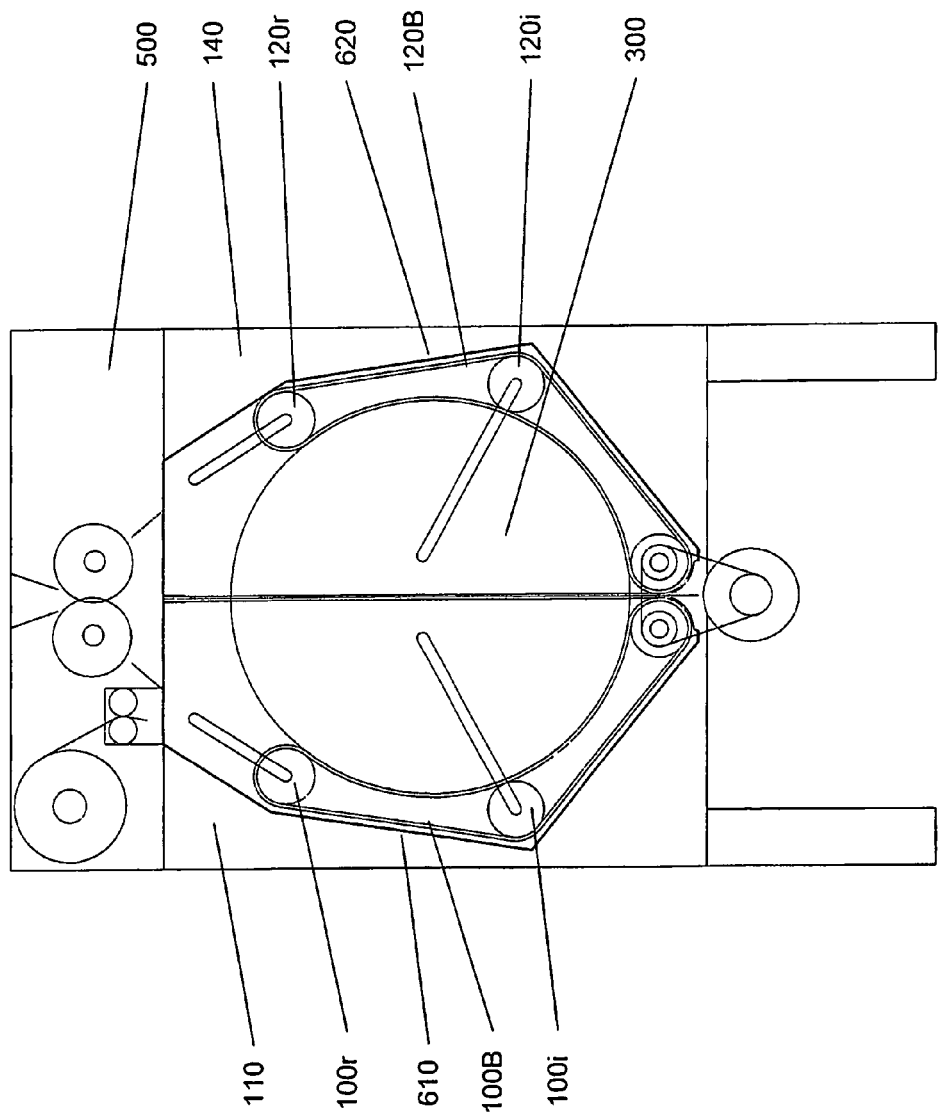

FIG. 14A shows the initial configuration of a machine in which a small amount of material has already been entered and a bale 300 is beginning to be formed. Growth of the bale continues in the manner already described in relation to the FIG. 8 sequence, until the situation shown in FIG. 14B is arrived at, in which a maximum size of bale is held within the machine. As may now be clearly seen from FIG. 14B, when a maximum size of bale 300 is held within the apparatus, and the return rollers 100*r*, 120*r* and intermediate rollers 100*i*, 120*i* are at their maximum deflection positions, the belts 100B, 120B are, on their return faces (i.e. the face non-adjacent to the bale 300) in close proximity with the backing plates 610, 620. In this manner, any material which, at any time had inadvertently passed to the wrong side of the conveyor belt will now be picked up by frictional contact with the relevant return face and brought around to the bale side face to be incorporated within the bale 300. At this point, the wrapping mechanism 540 comprising a roll of bale wrapping material 550 may be employed so as to secure the bale 300 prior to removal.

Figure 14C:
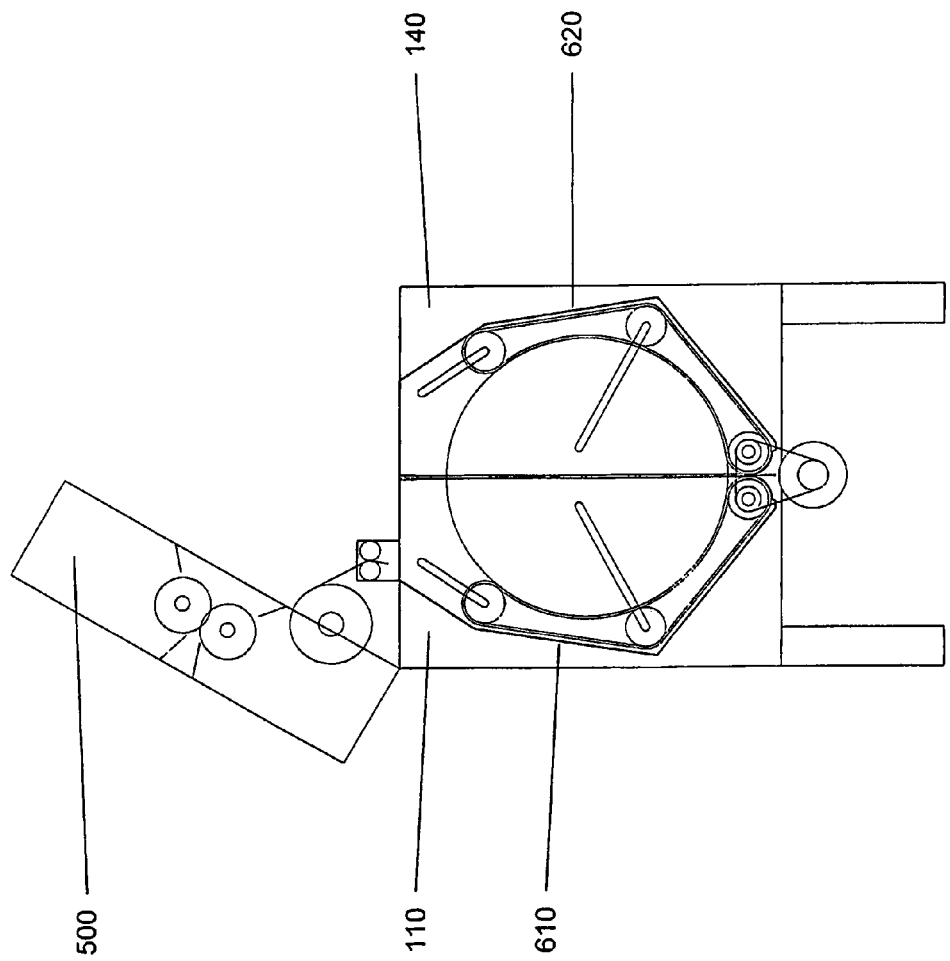
Figure 14D:
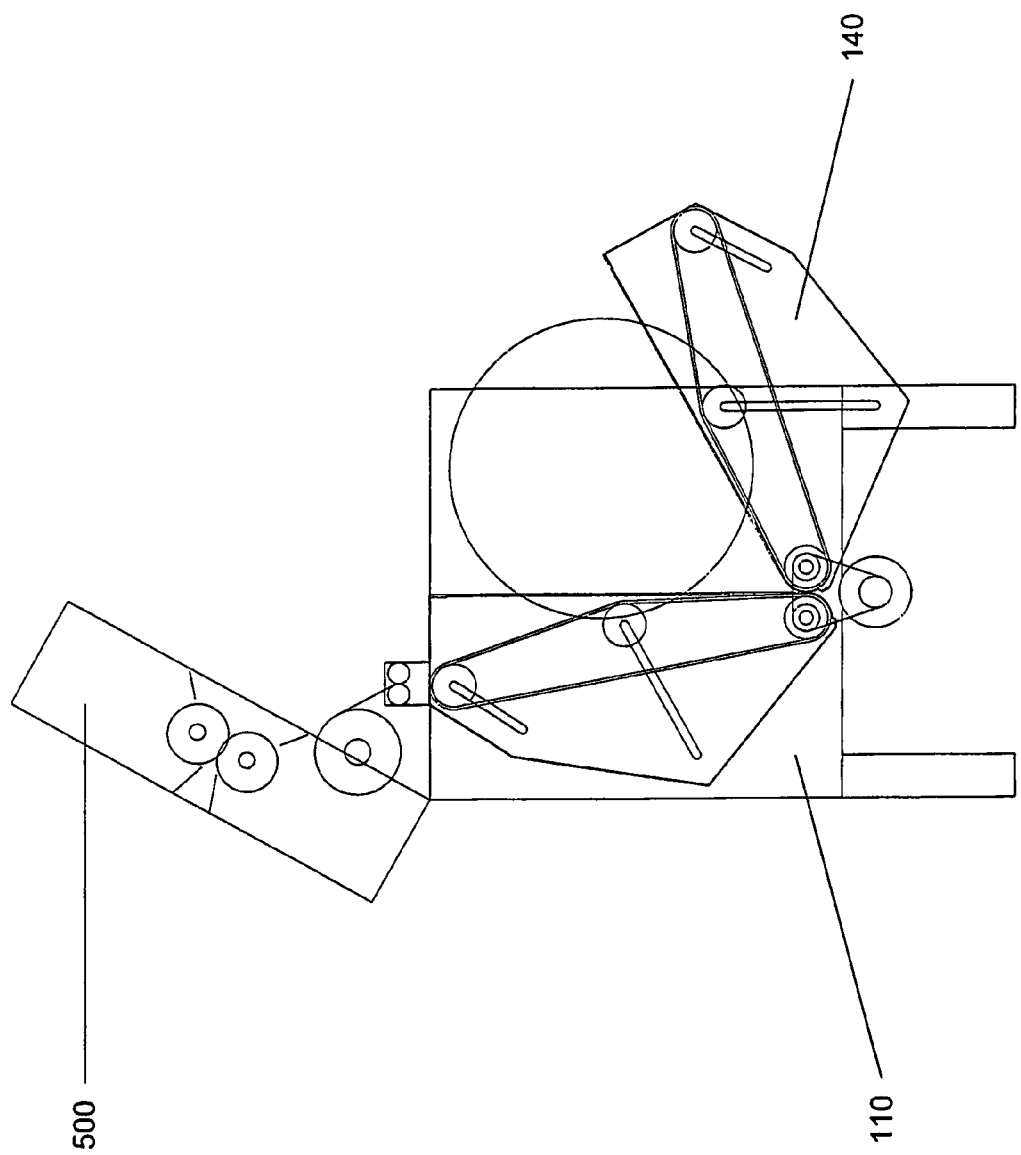

Referring now to FIG. 14C, the top part 500 of the baling machine is shown hinged away to allow access to the mechanism from above. In FIG. 14D, the whole right side of the mechanism, comprising a right side sub-chassis (consisting of right side front chassis plate 140 and right side rear chassis plate 150), together with associated right side rollers and belts, biasing means and guides etc. is shown swung away from a left side sub-chassis (consisting of left side front chassis plate 110 and left side rear chassis plate 130) and left side rollers, belts, biasing means, guides etc., so that the belts adopt the configuration previously described in relation to FIG. 8I, to allow the bale 300 to be removed from the side of the machine.

Referring now to FIGS. 15A through 15G, a third embodiment of baling apparatus is shown schematically and will be described now.

Referring to FIGS. 15A to 15G, the apparatus of the third embodiment comprises similar elements to the elements of the second embodiment. Again the first and second conveyor mechanisms designated 100, 120 are arranged in an initial Y-type formation, and again three rollers are employed by each conveyor. To simplify the description, the same reference numerals and letters are used in FIGS. 15A to 15G as in FIGS. 8A through 8G to designate the same or similar parts.

In more detail, the apparatus of the third embodiment comprises a first conveyor mechanism 100, and second conveyor mechanism 120. In the same fashion as the second embodiment, each of the first and second conveyor mechanisms comprise driven rollers 100*d*, 120*d*, return rollers 100*r*, 120*r* and intermediate rollers 100*i*, 1201. Biasing mechanisms are provided associated with the intermediate rollers and return rollers. Here, the biasing mechanisms conveniently comprise a single gas spring for the left side and one for the right side (see FIG. 16 for details) along with guides 180*i*, 200*i* for the intermediate rollers 100*i*, 120*i* and guides 180*r*, 200*r* for the return rollers 100*r*, 120*r*. The path of the roller is dictated by the guides which typically include pegs at end regions of the rollers moving in slots. The return roller 100*r* is linked to intermediate roller 1001 by a rigid connecting rod 100*c*, and rollers 120*r*/120*i* are similarly linked by rod 120*c*. These two rods 100*c*, 120*c* further define the paths of movement of the rollers as the bale 300 grows. Each of the first and second conveyor mechanisms also comprise belts 100B, 120B. Also shown in FIG. 15A is a motor M and gearing mechanism G for driving the rollers 120*d* or directly driving the belts 100B, 120B.

Figure 15A:
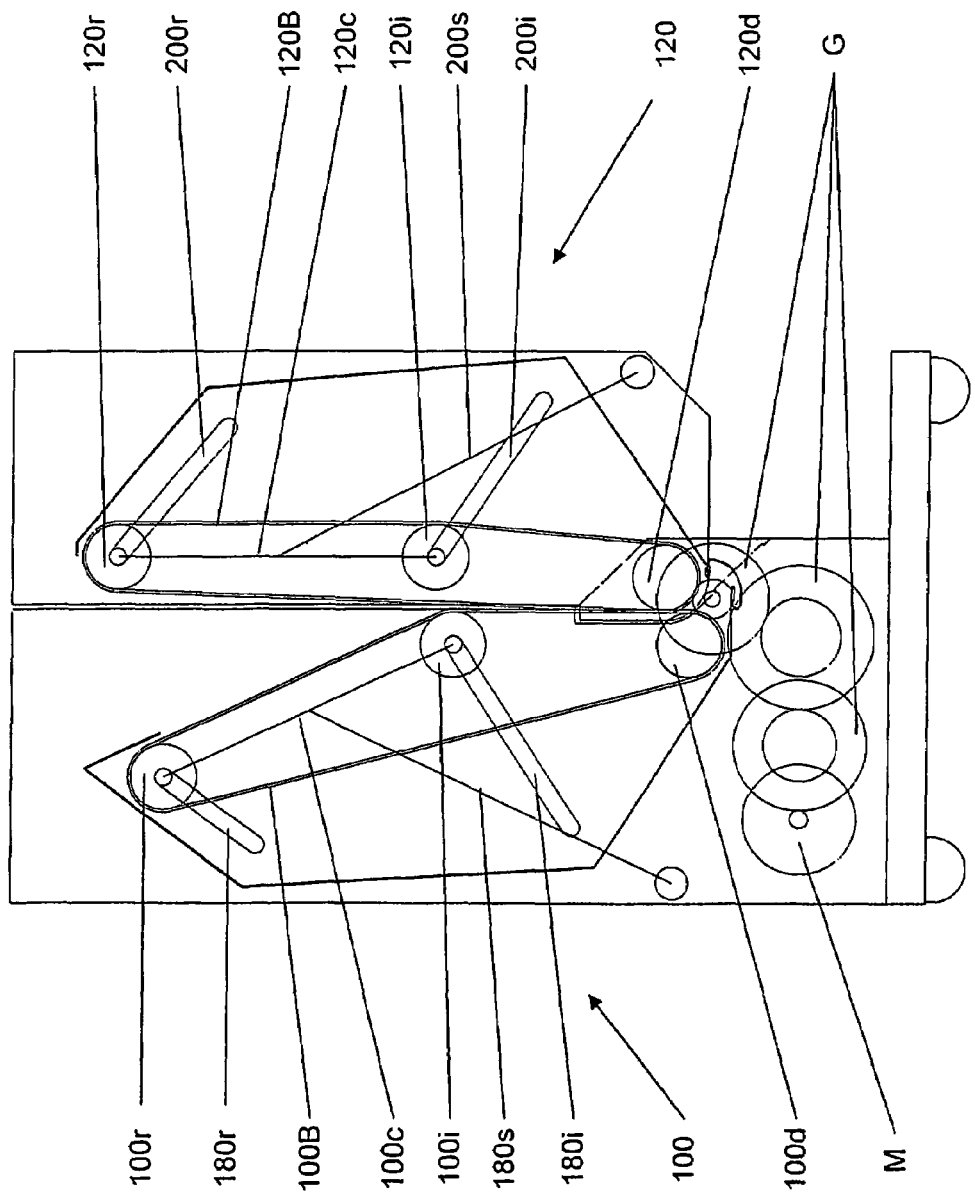
FIGS. 15A through G show details of a baling apparatus constituting a further embodiment of the invention.

Referring in detail to FIG. 15A, the apparatus of the second embodiment is shown in an initial configuration prior to the introduction of waste material. Here, it will be appreciated that of course the belts 100B, 120B are arranged to counter rotate in the same manner as the belts 100B, 120B of the second embodiment, such that material held between them is rolled.

In addition to the above features, it will be appreciated when comparing FIG. 15A with, for instance, FIG. 8A that the configuration of rollers, particularly the configuration of the intermediate rollers 100*i*, 120*i* and the driven end rollers 100*d*, 120*d* is slightly different in the third embodiment to that of the second embodiment. Here, points of note are that the driven rollers 100*d*, 120*d* are arranged such that their central axes of rotation are vertically offset from one another, whilst maintaining the two rollers in close proximity to one another. In more detail, it will be appreciated that the horizontal distance between the two central axes of the rollers 100D, 120D is less than the sum of their respective radii. In other words, when considering paths between the two offset drive rollers, there is no vertical passage between them so that waste material being deposited between the two belts, is prevented from running straight through the machine under gravity.

Another point of difference to note between the second and third embodiments is the area designated by the arrow F and enclosed within the dashed line area. Here, it can be seen that the intermediate roller 120*i* is set back from an under surface of the conveyor 120B, such that the initial configuration of the belt surface toward the inner part of the machine (i.e. the waste collecting and baling part) is defined by the positions of the return roller 120*r* and the drive roller 120D, the belt 120B running very close to the belt 100B, at an area adjacent the intermediate roller 100*i*, so as to provide a very tight in-feed belt gap. Here, waste being deposited into an entry region of the machine is quickly deposited into the area F and the fact that the intermediate roller 120*i* is set back slightly, ensures that pressure on the belt 120B is not overly great at this point, such that the belt 120B is relatively easy to deflect. Here, during the initial stages waste is quickly drawn into the pinch region which can be defined as a region running between the lowermost (driven) rollers and the intermediate rollers and enclosed by the two belt surfaces 100B, 120B. Also, in cases where it may be desirable to use a starter roll, the offsetting of the intermediate roller 120*i* aids passage of that starter roll into the pinch region.

Figure 15B:
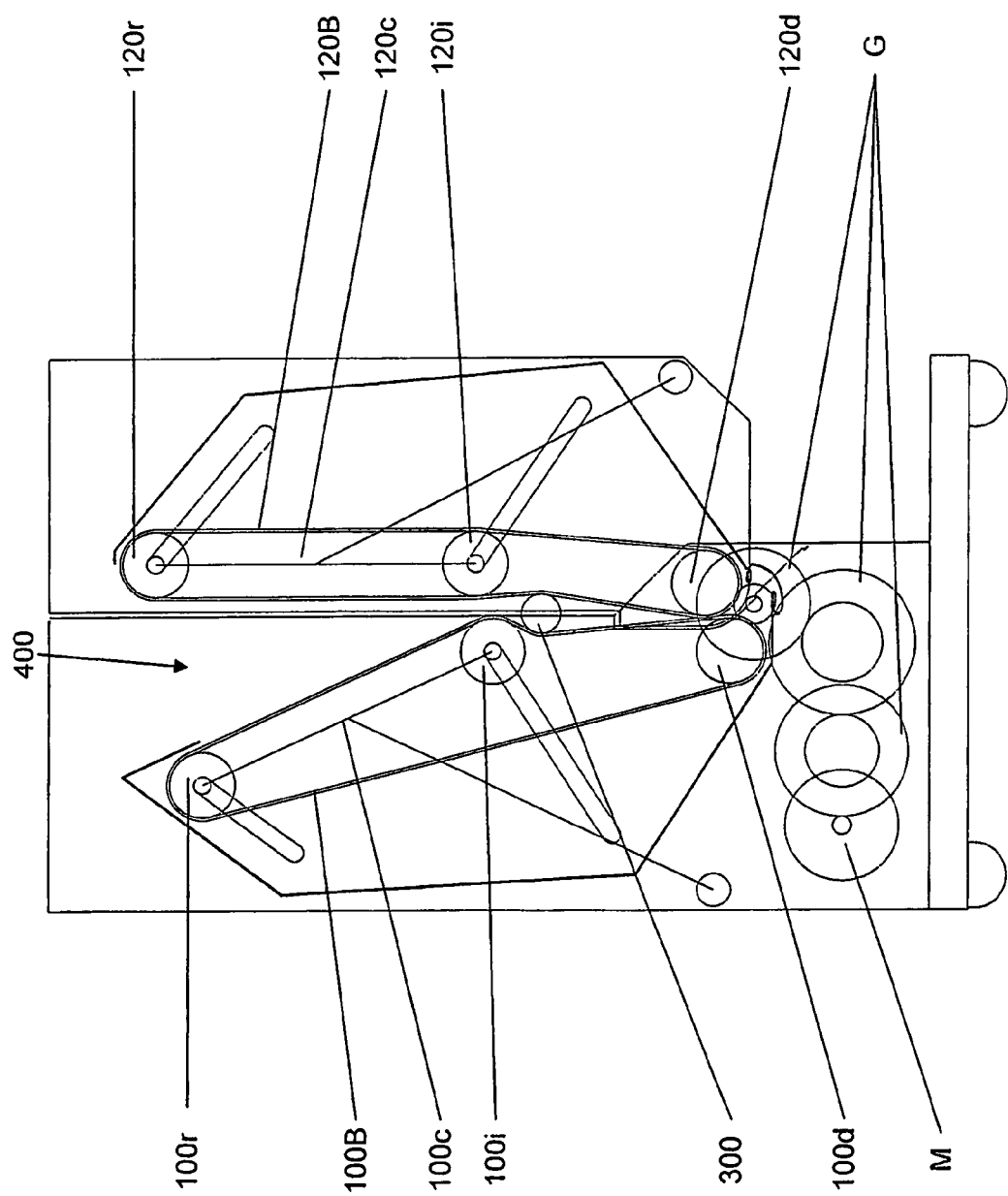

Referring to FIG. 15B, a first stage in a baling operation is shown. Here, material has been introduced and a roll started.

Due to the fact that the driven rollers 100D, 120D are fixed in position relative to one another, and the intermediate rollers 100i, 120i are spring biased into position so as to urge them toward one another, material introduced into a gap 400 at the upper ends of the first and second conveyors will, as it grows, naturally rise to a point just below the intermediate rollers 100i, 120i, such that as the bale 300 grows, the belt 120B, being less strongly supported in the pinch region than the belt 100B, initially deflects such that the belt 120B comes into contact with the surface of the offset roller 120i.

Figure 15C:
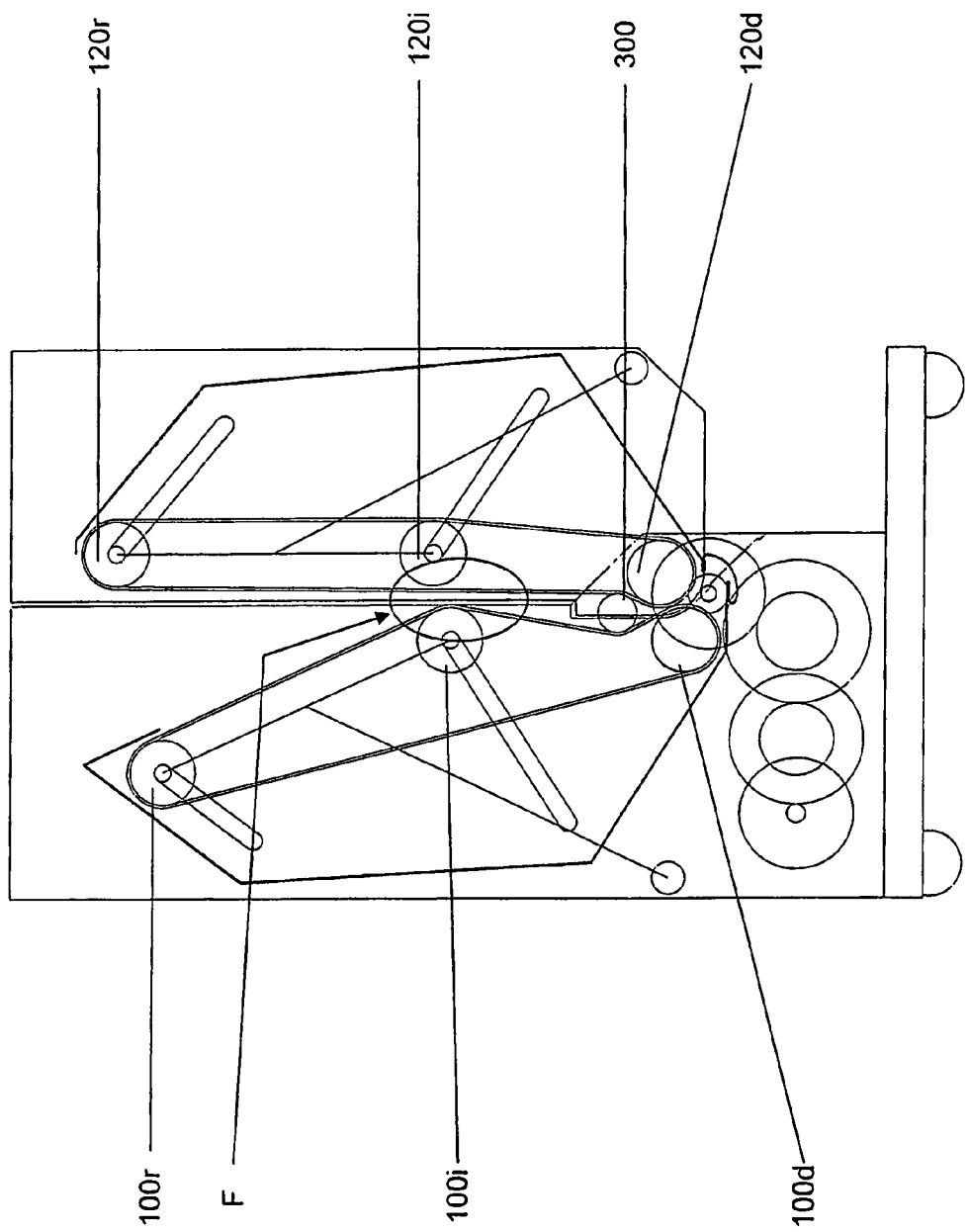
Figure 15D:
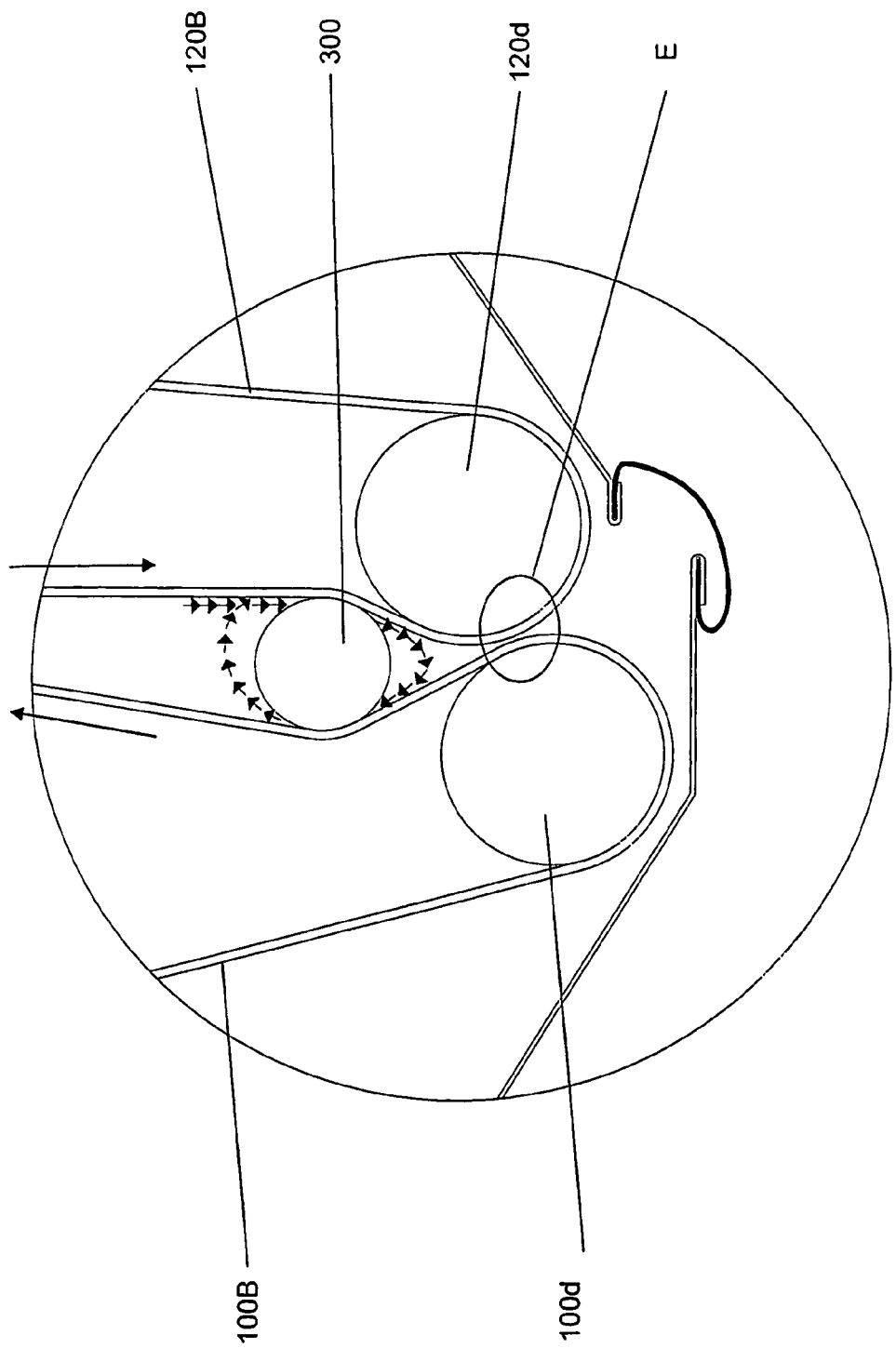

Very quickly after the stage shown in FIG. 15B (which shows a bale automatically starting, or staring around a starter roll just having been placed in the machine), the starter roll/bale moves into the position shown in FIG. 15C. This rapid change in position of the bale 300, is facilitated by driving the belts 100B, 120B at different surface speeds. This is now explained in more detail in FIG. 15D which is a close-up view near the driven end of the belts 100B, 120B. Belt 120B is run in the direction shown by the large arrow to the top and right of FIG. 15D, whilst belt 100B is driven in the opposite direction as shown by the large arrow to the top and left of FIG. 15D. Belt 120B is, in this embodiment, running at a faster surface speed than belt 100B, such that the in-feeding side of the bale 300 will tend to run at a higher speed than the out-feeding side of the bale. Of course, it will be readily appreciated that the bale 300 is (when used in conjunction with a paper shredder) a mass of individual strips or sheets of waste, rather than a single cohesive entity. However, providing the differential speeds in this manner has been found to provide a very efficient means of bale forming in that the mass of the bale 300 is subjected to constant agitation and accelerative forces. Also, the belt speed differential helps keep the bale in the machine—preventing any tendency for the bale to be driven out. The small arrows around the bale 300 are intended to illustrate the path of the actual waste material as it is wrapped around the bale in ever decreasing circles as a result of the layout of the belts and the differential belt speeds. Also, by providing the drive rollers 100d, 120d in the offset fashion already mentioned, it can be seen that the area E of FIG. 15D gives a small, or minimum, belt gap, with the path between the two rollers 100d, 120d being offset from the vertical. Again, this layout of rollers serves to keep the material trapped and enhances the bale forming.

Figure 15E:
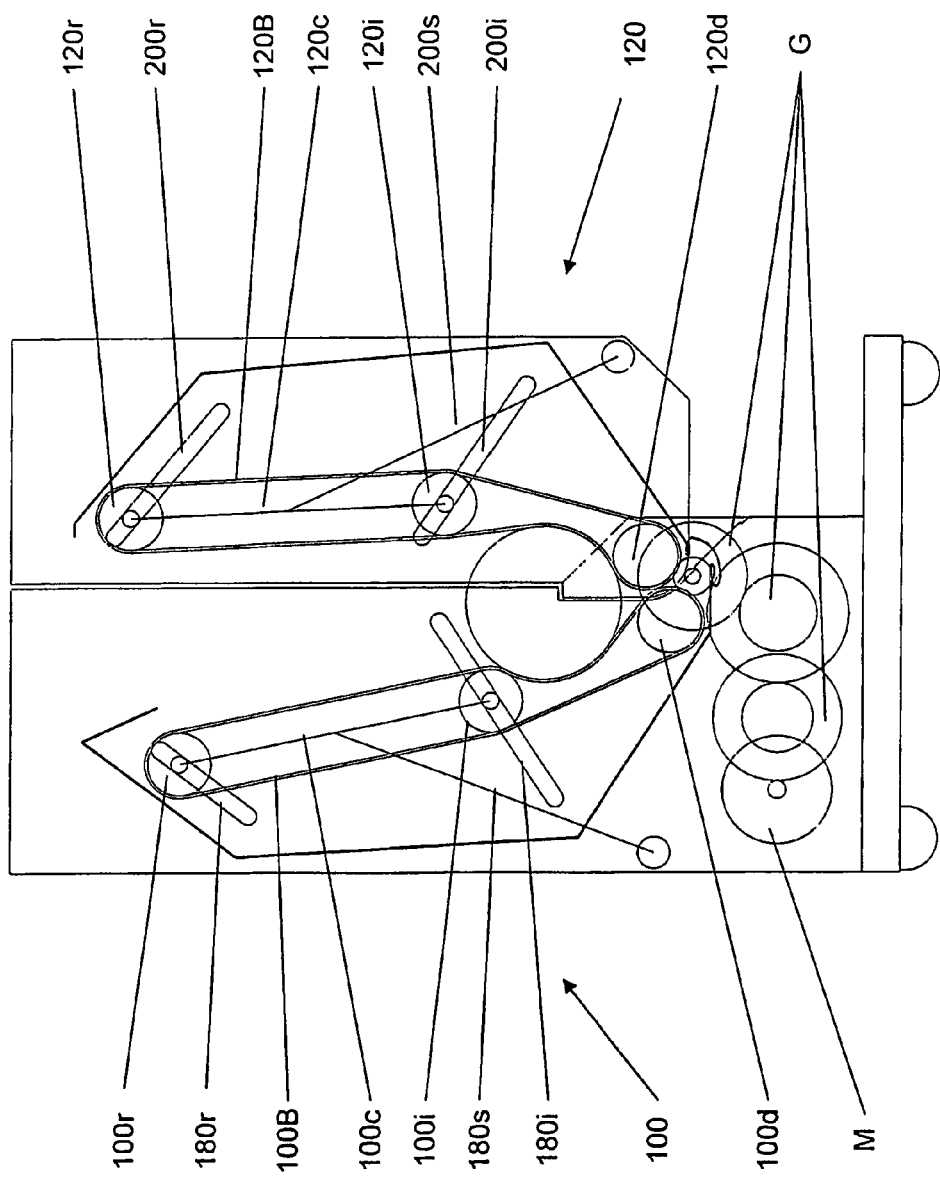

Referring now to FIG. 15E, it can be seen that the two intermediate rollers are forced gradually apart with the gas springs being further linearly compressed and moving from a position where the associated axle of the roller is at an inner end stop position of the guides to a position slightly displaced from the inner end stop. It will be noted here that as the springs are further compressed the material being rolled is further compacted so as to form a compacted and now growing in size bale 300.

FIG. 15E shows a stage in bale formation, where it can be seen that the bale has grown to a point at which the two intermediate rollers 100i, 120i are being forced apart as their central axes travel along the path defined by the resilient biased means 180i, 200i comprising gas springs and guides.

As the size of the bale 300 increases, intermediate rollers 100i, 120i are forced further and further apart and the return rollers 100r, 120r are also forced to begin travel along the axes defined by the guide parts of the associated resilient biasing means 180r, 200r. This latter travel starts to open up the entry area 400 of the baling mechanism to make it wider.

Figure 15F:
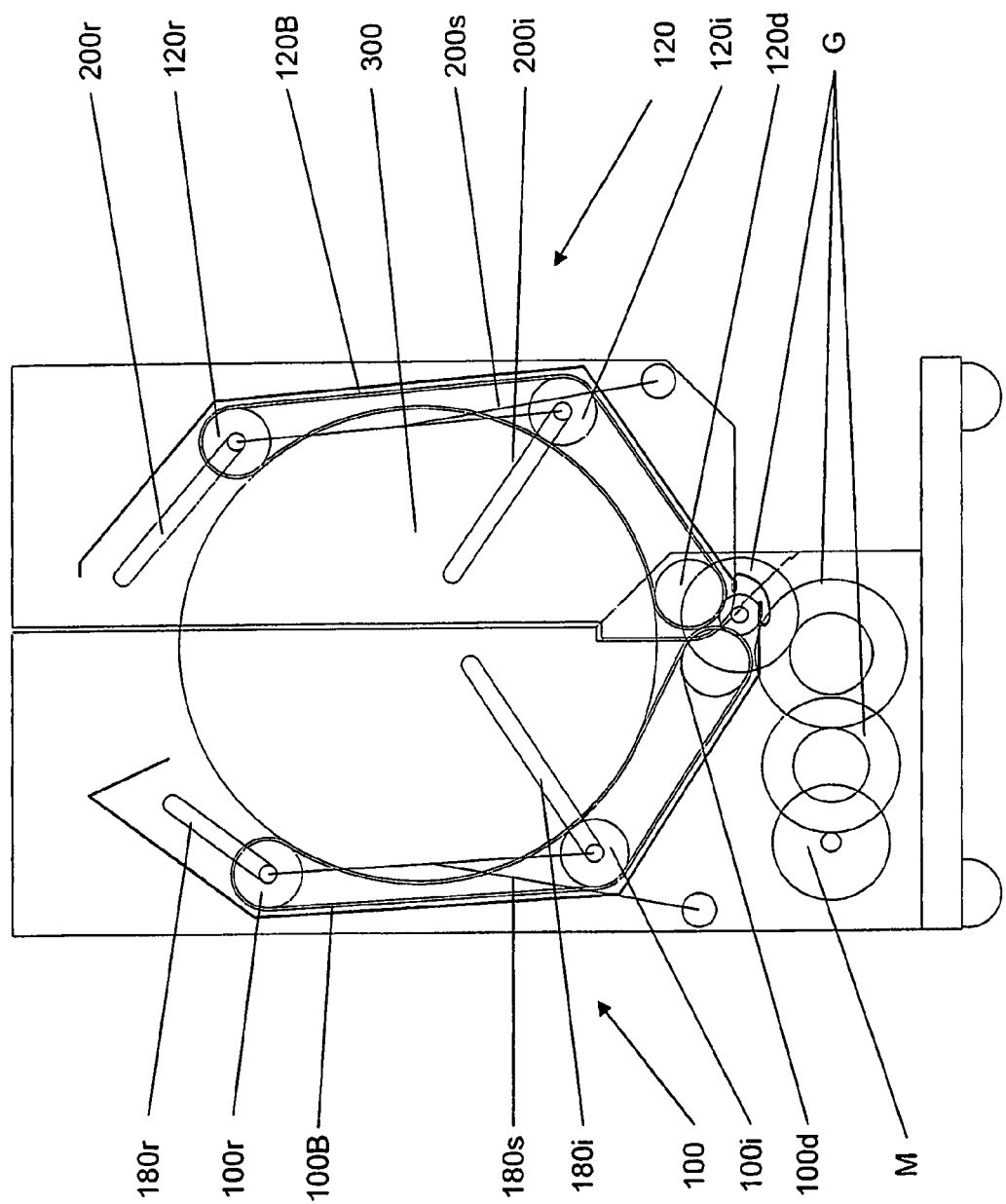

In FIG. 15F, it can be seen that the bale 300 has now reached a maximum size, in which the intermediate rollers, 100i, 120i have reached the end of their travel as defined by the central longitudinal axis of the guide parts of the biasing means 180i, 200i and, similarly, the return rollers 100r, 120r are in their extreme positions as defined by outer end stops. Here, the stops form part of the rollers themselves—i.e. the rollers slide in closed tracks (slots).

Figure 15G:
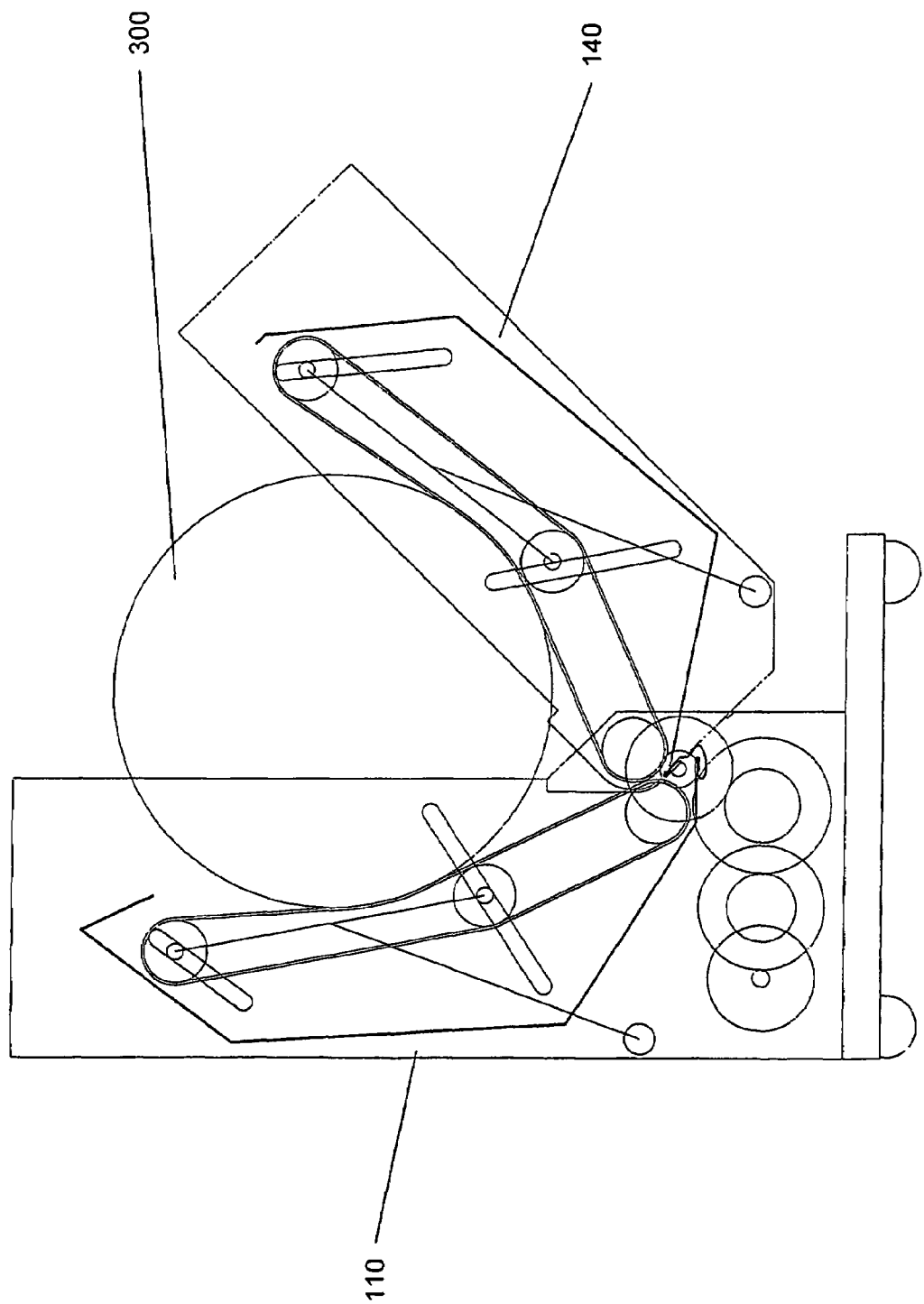

Referring now to FIG. 15G, a schematic representation is shown by which the bale 300 may be removed from the baling apparatus. In this illustration, it can be seen that an arrangement is provided which allows the right hand side 140 to swing out away from left hand side 110, away from a central line of the baling apparatus to increase gap 400 sufficiently to remove the bale 300 from the side of the apparatus.

Figure 16:
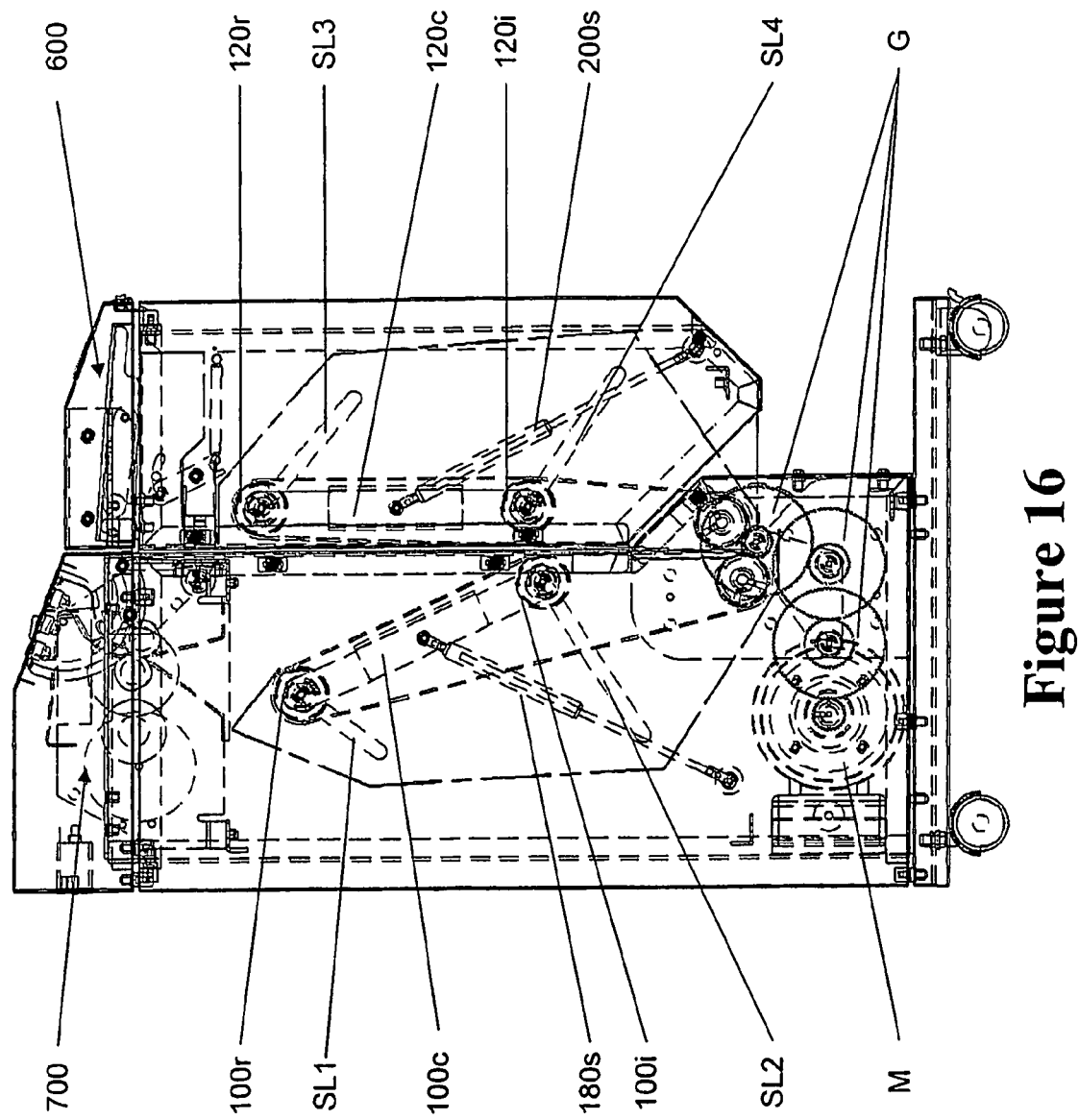
FIG. 16 is a schematic cut-away view of a baling machine incorporating the principles of the embodiment of FIGS. 15A to G.

FIG. 16 is a schematic cut-away view showing particular detail of the biasing arrangements comprising springs and slots, and connecting rods. Here, it can be seen that the biasing means may comprise gas springs or struts 180s, 200s which each act upon rigid connections 100c, 120c. These rigid connections 100c, 120c provide a method of transmitting the biasing force to both rollers 100r, 100i and 120r, 100r using a single biasing device (here a gas spring) for the left and right sides of the apparatus as the rollers 100r, 100i and 120r, 120i move along the paths defined by guide slots SL1 to SL4 during growth of the bale. The interconnection of the intermediate and return rollers of each conveyor, and the biasing of a pair of rollers by means of a single gas springs 180s, 200s provides a very efficient means of movement of the conveyor sides.

The connecting rods length remains the same at all times, whilst the rollers move along the guide paths, the fixed length rod ensuring that the belt tension is maintained, i.e., negating the requirement of a separate belt tensioning device—this we believe is one of the fundamental claims of the patent.

The fixed rod and the biasing device providing both the belt tensioning method and the compaction force on the bale (improved when combined with dissimilar belt speeds).

FIG. 16 also shows (but we will not discuss it further here) the bale wrap device 600 and the incorporation of a proprietary waste shredder 700 above the compaction unit.

From the above description it will be clear that the invention provides many advantages over other compacting arrangements. Particularly advantageous, is the fact that the use of belts allows the machine to be very efficient in use of energy, with the belt tension itself supplying the drive of the roll (bale). Because the rollers are under a spring force and in constant contact with the roll (through the belt), this results in the bale being much more compact than would be if it were to rely on tangential belt tension alone. The design as disclosed in FIG. 8 onwards utilising only three rollers, gives a particularly efficient design by minimising the number of belt pivot points. Here, it will be noted that the top rollers (i.e. the return rollers) provide belt tension as well as compaction. The use of the V or Y design when combined with the belt tensioning method negates the need for additional surplus belt length and associated belt length take-up.

The facility to utilise an outer skin, comprising the back plates 610, 620, is advantageous and waste efficient to prevent waste from escaping and encourages such waste to be dragged back into the V (or Y) hence providing a self-cleaning mechanism. Whilst offsetting the drive rollers 100d, 120d as described in relation to FIG. 15A onwards minimises the chance of any such escape of material in the first place. Also, the differential drive speeds of the belts as discussed provides improvements in bale formation and compaction.

It will be appreciated that the above described embodiment merely illustrates the principles involved in implementing the invention in preferred ways and that various modifications may be made within the scope of the invention.

In a first variation, instead of material deposited in the apparatus being gravity fed, it may instead be conveyed toward the pinch region in other ways. For instance, under air or gas pressure, mechanical pressure or fluid pressure.

Further, whilst the resilient biasing means is shown acting on each conveyor it will be realised that one conveyor may be kept in a substantially fixed orientation whilst the biasing means acts to bias the (second end of the) other conveyor towards it.

The resilient biasing means and the guide means may be provided by either separate or combined resilient biasing and guiding means operating along shared or separate axes. For instance, the resilient biasing may take the form of a spring in tension or compression, or a hydraulic, gas or pneumatic cylinder or any other suitable means. The guiding means may comprise slots formed in chassis members constricting movement of conveyor rollers/guides to particular pathways, or may comprise elongate members with end stops and over which a spring may be arranged, or could for instance comprise some form of mechanical linkage to restrict movement of the conveyors in various directions. Therefore, while a few types of resilient biasing and guiding means have been mentioned, it will be appreciated that the invention should not be limited to the particular examples discussed.

In other variations the guide may not guide over linear paths, but instead over any desired curved path. For instance, opposed ends of an axle of the return roller(s) or of an intermediate roller may be guided by curved slots formed in a support carriage (not shown) or by any form of appropriate mechanical linkage.

Although mechanisms for aiding the initial formation of a bale, such as feeding the machine initially with a starter roll have been discussed, it will be appreciated that rolls may be started in a number of different ways. For instance, it has been found that in the Y-type design, particularly the design set out in FIG. 15A onwards, no starter roll may be required and changes to the configuration of others of the embodiments by, for instance, incorporating differential belt speeds in the embodiment of FIGS. 1 to 6 can improve the bale starting capability. Other mechanisms for starting rolls may comprise providing one or more deflector plates within the apparatus, or rollers within the apparatus to retain an initial mass of a bale in an appropriate position adjacent the intermediate rollers. Also, whilst means for independently positioning individual rollers have not been described, it will be appreciated that mechanisms for changing the position of intermediate rollers in order to start a roll may be provided.

It will be appreciated that various different materials may be utilised in the present invention. For instance, conveyor belt material may comprise rubber, plastic, chain, webbing, V-belts, timing belts, woven fabrics, composites or any other suitable material. In other possible variations, a belt may be replaced by a series of closely spaced rollers. Also, wherever "belt" is mentioned, it will be appreciated that more than one belt is encompassed by this term. For instance, a plurality of side by side arranged belts, to form a single wide composite belt may be envisaged.

Wherever "Y" configurations for the conveyors are mentioned, this is taken to mean all arrangements in which, in an initial state, the apparatus has conveyors arranged such that an entry region between the two conveyors feeds toward an area where the surfaces of the opposed conveyors become closely adjacent, this area being at a point intermediate first and second ends. Generally, this point being somewhere between 25% and 85% of the distance from first to second end. It will be appreciated that the term "Y" is intended to cover both symmetrical and asymmetrical arrangements.

It will be appreciated in the above described embodiments that the tension of the drive belts 100B, 120B supplies drive to the intermediate and return rollers.

The skilled man will realise that roller movement could be achieved by either slots, linkage arms, lead screws, linear guides, gears, friction devices, cams or other convenient means.

As far as the biasing means are concerned, such biasing means may comprise tensioning device which could be either sprung (compression or tension) and include the possible use of stretched rubber, motor driven arrangements, pneumatic driven arrangements, hydraulic, gravity or weight driven arrangements.

The rollers may be rubber coated to increase friction on the drive belts. The rollers may be integral roller/bearing/shaft type, separate items, solid or hollow, manufactured from metal, plastics or composite or other convenient material. Roller bearings may be traditional steel, plastics, composite, brass, oilite, etc.

The term roller as used herein is not limited to cylindrical rollers, but is intended to include items such as "cogs" whilst the term "belt" is intended to extend to items such as tracks or chains and to articulated conveyor surfaces.

In the arrangement shown in FIG. 14 and in other convenient arrangements it will be appreciated that the design of the chassis (frame) allows the spreading of the V-Y shape to allow the bale to be removed. The frame design includes spaces for a bale wrapping mechanism and space for the drive. It will be appreciated that any particular drive design for the mechanism may be selected. For instance, the drive may be by self-contained rollers containing motor/gear boxes, an external drive (motor/gear box) via gears, drive belt, drive shafts or other linking mechanisms, or even hand operated or clockwork.

While the invention has been described in relation to baling paper etc., it will be realised that it is not limited to such applications. For instance, the apparatus may find utility in other industries such as processing of waste food, cardboard, plastics, etc.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A baling apparatus comprising at least two first and second mutually opposed and vertically inclined conveyors, each of the conveyors having a first end and a second end, the second ends being arranged to be spaced apart to form a material entry region into which material to be baled is, in use, deposited, the first ends being relatively closely adjacent to each other, an intermediate point between the first end and the second end of each of the conveyors being arranged to form a pinch region where the two conveyors are close to one another, and the apparatus being arranged such that material deposited into the entry region moves toward the pinch region where the deposited material is rolled and compressed into a bale, the conveyors being driven in opposite directions to roll and compact the material between them, and the conveyors being mutually displaceable and resiliently biased towards one another, wherein means are provided for gathering material falling outside of the entry region to reincorporate such material, and wherein the means for gathering material comprise an outer skin positioned toward a return side of each of the conveyors away from a baling side, the outer skin being arranged such that when the bale is near a maximum size, the conveyor is arranged to pick up such material trapped between it and the outer skin and transport this material toward the pinch region.

2. The apparatus of claim 1, wherein each of the conveyors comprises a plurality of rollers around which extends a continuous belt.

3. The apparatus of claim 2, wherein each of the conveyors comprises at least a pair of end rollers, defining outer limits of the conveyor and at least one intermediate roller.

4. The apparatus of claim 3, wherein the first and second conveyors are driven at different surface speeds such that one conveyor runs faster than the other.

5. The apparatus of claim 4, wherein the faster conveyor runs in a direction to urge material from the entry region toward the pinch region.

6. The apparatus of claim 5, wherein, in use, the material being turned by the belts is pulled down by the faster conveyor, whilst the slower upward belt holds back the material so as to cause a "winding up" of the material.

7. The apparatus of claim 3, wherein the roller of each conveyor located at the respective first end has a substantially fixed rotational axis, while the rotational axes of the intermediate roller or rollers and of the roller located at the second end of at least one of the conveyors are biased by resilient biasing means such that they may travel along fixed paths guided by guide means as more material is deposited into the entry region.

8. The apparatus of claim 7, wherein, in use, the pinch region is broadened as more material is deposited.

9. The apparatus of claim 7, wherein the second ends of the conveyors are arranged, in use, to diverge as more material accumulates between the two opposed conveyors.

10. The apparatus of claim 7, wherein guide means are provided associated with each of the conveyors and each such guide means comprises a guide having first and second ends, and wherein resilient biasing means are provided associated with each of the conveyors, the resilient biasing means acting so as to bias the first and second conveyors toward the first ends of each guide, in which position the first and second conveyors are nearest to one another.

11. The apparatus of claim 10, wherein, in use, as more and more material is deposited into the gap between the two conveyors, the resilient biasing means acts to compact the material mass held at the pinch region.

12. The apparatus of claim 11, wherein as more and more material is, in use, compacted between the conveyors and the size of the compacted material held between them increases, the force exerted by the resilient biasing means is opposed by the growth in size of the material being compacted between the conveyors, such that the gap between the conveyors at the pinch region is allowed to increase by outward movement of the rotational axes of at least the intermediate rollers of said conveyors, such outward movement being in the direction of the second ends of respective guide means.

13. The apparatus of claim 12, wherein as yet more material is, in use, compacted between the conveyors and the size of the compacted material held between them increases, the force exerted by the resilient biasing means is opposed by the growth in size of the material being compacted between the conveyors, such that the gap between the conveyors at the second ends is allowed to increase by outward movement of the rotational axes of the rollers at the second ends of the conveyors, such outward movement being in the direction of the second ends of respective guide means.

14. The apparatus of claim 7, wherein the resilient biasing and the guide means comprise separate means.

15. The apparatus of claim 14, wherein the resilient biasing means and guide means operate along shared axes, each guide means being associated with its own resilient biasing means.

16. The apparatus of claim 14, wherein the resilient biasing means and the guide means operate along separate axes, with each resilient biasing means being associated with a plurality of respective guide means.

17. The apparatus of claim 16, wherein a single resilient biasing means is associated with a single conveyor.

18. The apparatus of claim 7, wherein the guide means comprise slots formed in chassis members constricting movement of rollers of one or more of the conveyors to particular pathways.

19. The apparatus of claim 7, wherein means are provided for mutually spreading the second ends of the conveyors following the end of a baling operation to facilitate the removal of material which has been compacted between the conveyors.

20. The apparatus of claim 19, wherein the means for spreading comprises disengaging at least one second end from its associated resilient biasing means to allow said at least one second end to be freely moved away from the second end of the other conveyor.

21. The apparatus of claim 19, wherein the means for spreading comprises disengaging an associated resilient biasing means from a fixed chassis mounting point to allow both the resilient biasing means and the associated second end of conveyor to move.

22. The apparatus of claim 19, wherein the means for spreading comprises means for pivoting one conveyor away from the other.

23. The apparatus of claim 3, wherein means for facilitating the removal of compacted material from the apparatus comprise movement of the first and second conveyors away from one another to provide access to the compacted material.

24. The apparatus of claim 23, wherein, the first conveyor is supported by a first sub-chassis, and the second conveyor by a second sub-chassis, removal of the compacted material being facilitated by disassociating the first sub-chassis from the second sub-chassis.

25. The apparatus of claim 3, wherein in an initial state of the apparatus, at least one pair of opposed rollers of the two conveyors have central axes which are vertically displaced from one another, and are separated horizontally from each other by a horizontal distance which is less than a sum of the radii of the respective two rollers.

26. The apparatus of claim 25, wherein the opposed rollers in question comprise rollers at the first end of the conveyors.

27. The apparatus of claim 25, wherein the rollers in question comprise a pair of intermediate rollers positioned above the pinch region.

28. The apparatus of claim 1, wherein the conveyors are resiliently biased towards one another at the pinch region.

29. The apparatus of claim 28, wherein at least one intermediate roller of one of the conveyors is resiliently biased toward the pinch region such that as more material is baled between the opposed conveyors the resilient biasing acts to compact the material.

30. The apparatus of claim 29, wherein the at least one intermediate roller is resiliently biased toward the pinch region, such that as more material is deposited into the pinch region, intermediate rollers of the opposed conveyors are forced away from one another along defined paths.

31. The apparatus of claim 3, wherein during an initial state in which the apparatus has no material deposited into it, at least one intermediate roller of one conveyor is arranged to not be in contact with its respective belt, such that the belt is not directly supported in the area of the pinch region.

32. The apparatus of claim 1, wherein the pinch region is defined by an adjacent relation of intermediate rollers of the opposed conveyors forming an area of constriction within which, in use, material to be baled gathers to be rolled.

33. The apparatus of claim 1, wherein said conveyors comprise a pair of conveyors which, in an initial state, are arranged in a Y formation, the first ends of the conveyors forming the base of the Y, and the second ends forming the top of the Y.

34. The apparatus of claim 1, wherein said conveyors comprise a pair of conveyors driven in opposed directions and provided in a V formation, the first ends of the conveyors forming the base of the V, and the second ends forming the top of the V.

35. The apparatus of claim 1, wherein each conveyor has a belt of substantially constant length, the conveyors being arranged so as to bow outwardly as the circumference of baled material held between them increases, avoiding the need for a separate belt take-up means.

36. The apparatus of claim 1, wherein the apparatus further comprises a bale wrapping mechanism for wrapping completed bales.

* * * * *